(12) United States Patent
Sun et al.

(10) Patent No.: US 11,665,700 B2
(45) Date of Patent: May 30, 2023

(54) ADAPTIVE CONTENTION WINDOW AND BURST LENGTH FOR RECEIVER BASED ECCA FOR MMWAVE BAND

(71) Applicant: QUALCOMM Incorporated, San Diego, CA (US)

(72) Inventors: Jing Sun, San Diego, CA (US); Vinay Chande, San Diego, CA (US); Xiaoxia Zhang, San Diego, CA (US); Arumugam Chendamarai Kannan, San Diego, CA (US); Srinivas Yerramalli, Hyderabad (IN); Tao Luo, San Diego, CA (US); Juan Montojo, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 17/125,059

(22) Filed: Dec. 17, 2020

(65) Prior Publication Data
US 2021/0250982 A1    Aug. 12, 2021

Related U.S. Application Data

(60) Provisional application No. 62/971,495, filed on Feb. 7, 2020.

(51) Int. Cl.
*H04W 72/04*  (2023.01)
*H04W 72/14*  (2009.01)
(Continued)

(52) U.S. Cl.
CPC .......... *H04W 72/14* (2013.01); *H04L 1/1812* (2013.01); *H04L 5/0055* (2013.01);
(Continued)

(58) Field of Classification Search
CPC ............... H04W 72/14; H04W 72/042; H04W 72/0446; H04W 74/0808; H04W 74/0833; H04L 1/1812
See application file for complete search history.

(56) References Cited

U.S. PATENT DOCUMENTS

2017/0019909 A1*  1/2017  Si ..................... H04W 76/28
2018/0367282 A1*  12/2018  Li ..................... H04L 1/1896
(Continued)

OTHER PUBLICATIONS

ETRI: "Remaining Details of CWS Adjustment Based on HARQ-ACK Feedback", 3GPP Draft, 3GPP TSG RAN WG1 Meeting #83, R1-157488, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 24, 2015 (Nov. 24, 2015), XP051042233, 5 Pages, Retrieved from the Internet: URL: http://www.3gpp.org/ftp/tsg_ran/WG1_RL1/TSGR1_83/Docs/. [retrieved on Nov. 24, 2015] the whole document.
(Continued)

*Primary Examiner* — Lan-Huong Truong
(74) *Attorney, Agent, or Firm* — Arent Fox, LLP

(57) ABSTRACT

Aspects are provided which improve LBT by associating contention windows with transmission burst lengths and by allowing contention windows and maximum burst lengths to be adjusted based on interference activity. For downlink, a
(Continued)

UE receives a PG for a downlink transmission from a base station indicating a CCA length based on a contention window size associated at least with a burst length for the downlink transmission. The UE performs, after receiving the pre-grant, a CCA based on the CCA length, transmits an APG to the base station when the CCA is successful, and receives the downlink transmission in response to the APG. For uplink, the base station performs a CCA based on a contention window associated at least with a burst length for an uplink transmission, transmits an uplink grant to the UE when the CCA is successful, and receives the uplink transmission in response to the uplink grant.

30 Claims, 16 Drawing Sheets

(51) Int. Cl.
H04L 5/00 (2006.01)
H04W 74/08 (2009.01)
H04W 72/0446 (2023.01)
H04L 1/1812 (2023.01)

(52) U.S. Cl.
CPC ..... *H04W 72/042* (2013.01); *H04W 72/0446* (2013.01); *H04W 74/0808* (2013.01)

(56) References Cited

U.S. PATENT DOCUMENTS

| 2019/0159266 | A1 | 5/2019 | Kim et al. | |
| 2019/0357255 | A1* | 11/2019 | Sun | H04L 5/0094 |
| 2019/0394792 | A1* | 12/2019 | Jeon | H04W 72/1268 |
| 2022/0201764 | A1* | 6/2022 | Myung | H04W 74/0866 |

OTHER PUBLICATIONS

International Search Report and Written Opinion PCT/US2020/066250 ISA/EPO Apr. 9, 2021.
Nokia, et al., "Channel Access and Co-existence for NR-U Operation", 3GPP Draft, 3GPP TSG RAN WG1 Meeting #99, R1-1912257, 3rd Generation Partnership Project (3GPP), Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 8, 2019 (Nov. 8, 2019), XP051819973, 17 Pages. Retrieved from the Internet: URL: https://ftp.3gpp.org/tsg_ran/WG1_RL1/TSGR1_99/Docs/R1-1912257.zip.R1-1912257 NR-U channel access.docx [retrieved-on Nov. 8, 2019] the whole document.
OPPO: "Channel Access Procedures for NR-U", 3GPP TSG RAN WG1 #99, 3GPP Draft; R1-1912506, 3rd Generation Partnership Project (3GPP), Mobile Competence Centre; 650, Route Des Lucioles; F-06921 Sophia-Antipolis Cedex France, vol. RAN WG1, No. Reno, USA; Nov. 18, 2019-Nov. 22, 2019, Nov. 9, 2019 (Nov. 9, 2019), 10 Pages, XP051823446, Retrieved from the Internet: URL: https://ftp.3gpp.org/tsg_ran/WG1_RL1/TSGR1_99/Docs/R1-1912506.zip R1-1912506.docx [retrieved on Nov. 9, 2019] pp. 5-6.

* cited by examiner

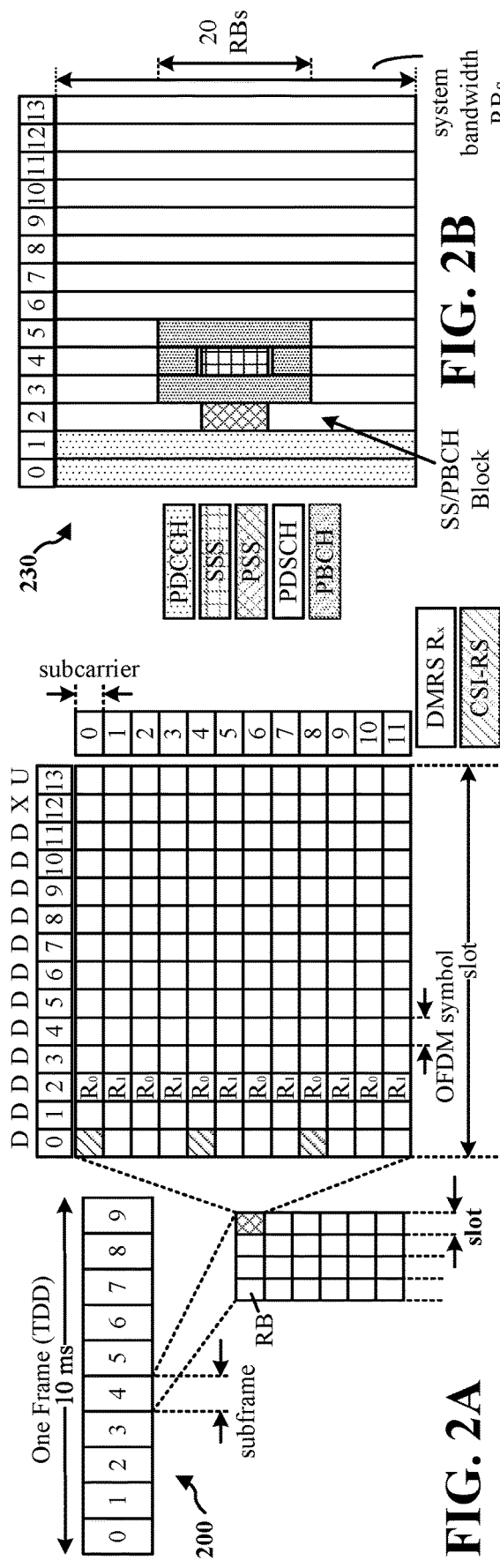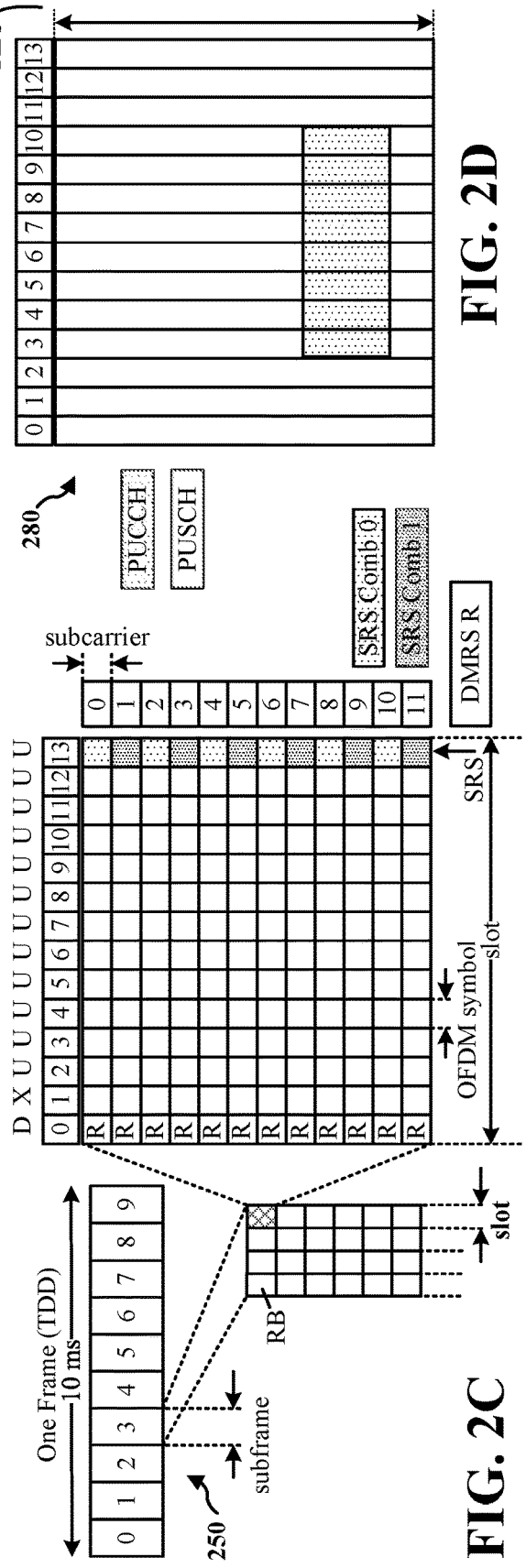

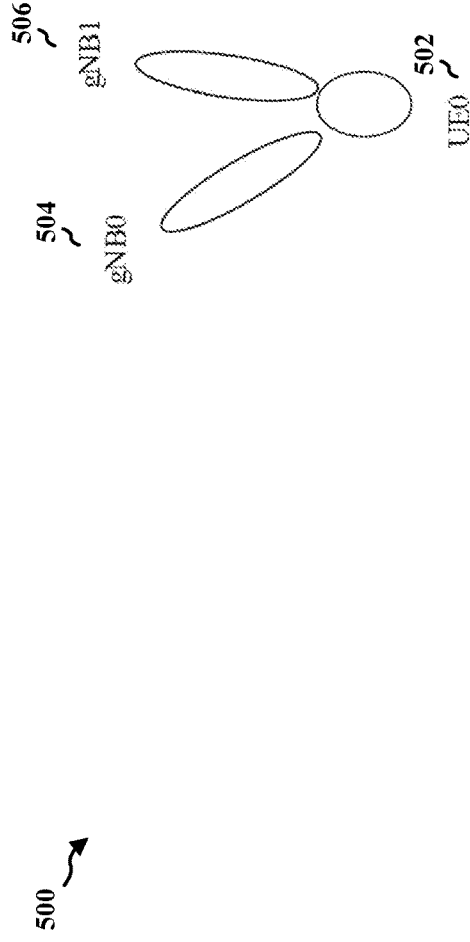
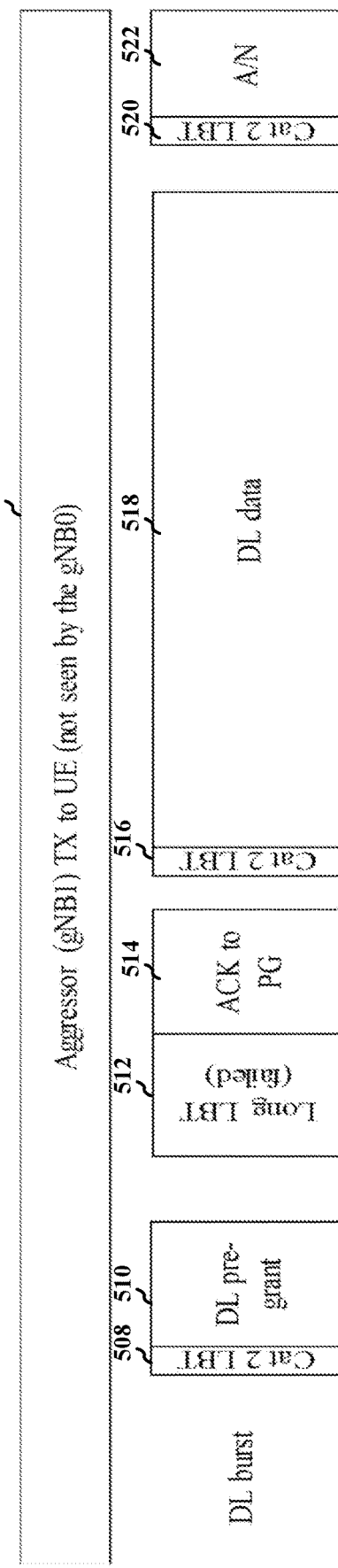
FIG. 5

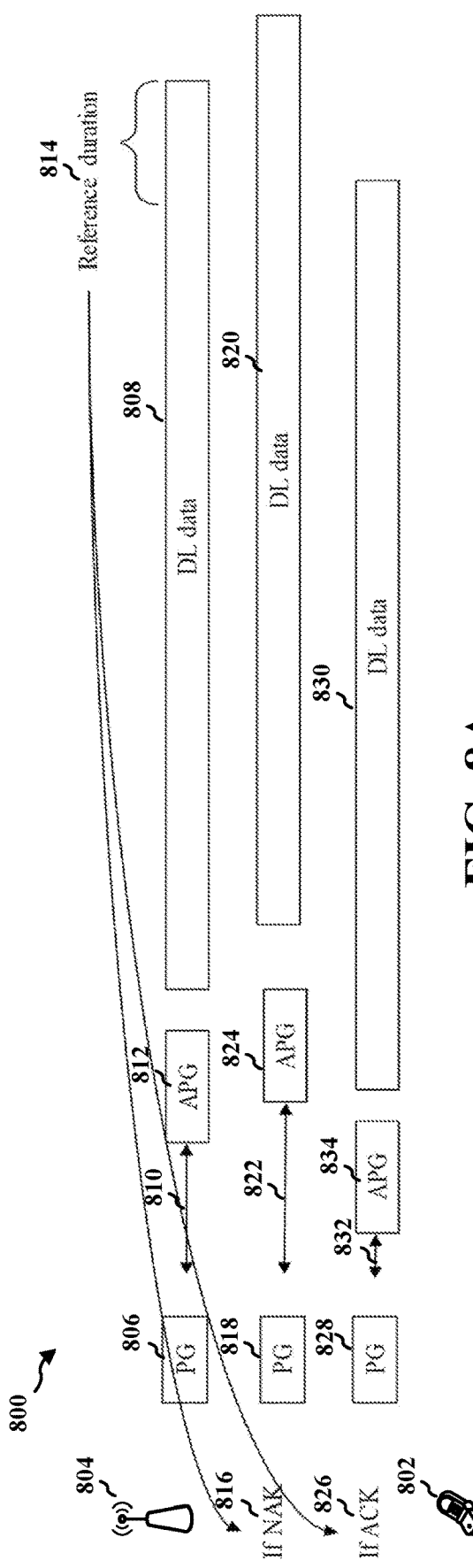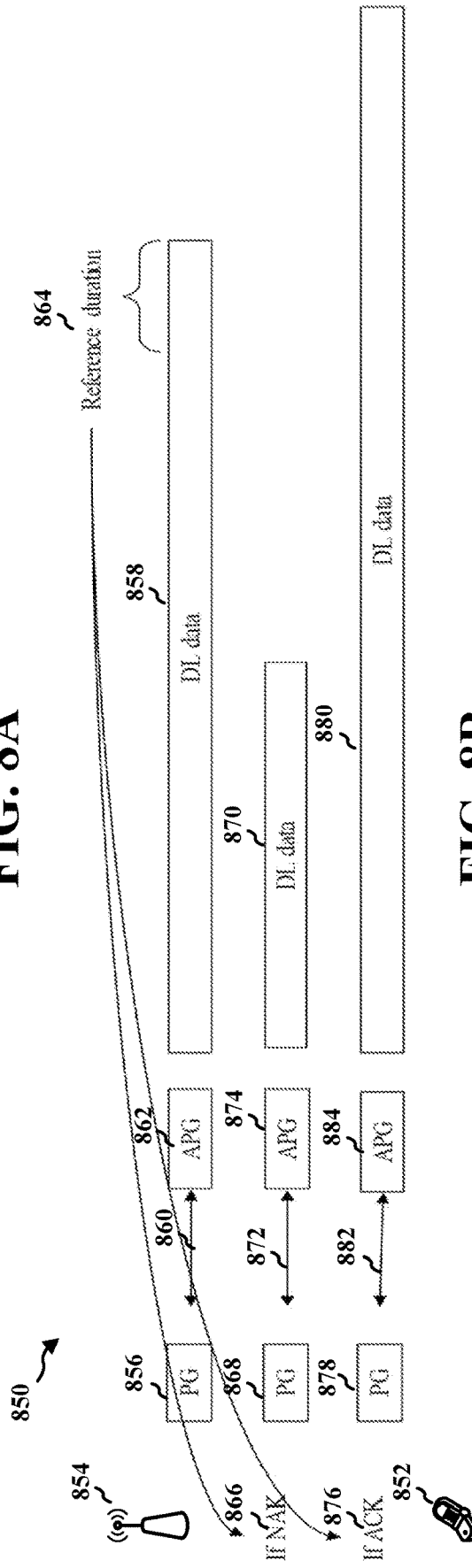
FIG. 8A
FIG. 8B

ADAPTIVE CONTENTION WINDOW AND BURST LENGTH FOR RECEIVER BASED ECCA FOR MMWAVE BAND

CROSS REFERENCE TO RELATED APPLICATION(S)

This application claims the benefit of U.S. Provisional Application Ser. No. 62/971,495, entitled "ADAPTIVE CONTENTION WINDOW AND BURST LENGTH FOR RECEIVER BASED ECCA FOR MMWAVE BAND" and filed on Feb. 7, 2020, of which is expressly incorporated by reference herein in its entirety.

BACKGROUND

Technical Field

The present disclosure relates generally to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives a pre-grant for a downlink transmission from a base station, the pre-grant indicating a clear channel assessment (CCA) length based on a contention window size associated at least with a burst length of the downlink transmission. The apparatus performs, after receiving the pre-grant, a CCA based on the CCA length. The apparatus transmits an acknowledgment of the pre-grant (APG) to the base station when the CCA is successful. The apparatus receives the downlink transmission from the base station in response to the APG.

In another aspect of the disclosure, a method, a computer-readable medium, and an apparatus are provided. The apparatus may be a UE. The apparatus receives an uplink grant from a base station after a clear channel assessment (CCA) of the base station. The apparatus transmits an uplink transmission to the base station in response to the uplink grant, where the CCA is based on a contention window associated at least with a burst length for the uplink transmission.

In another aspect of the disclosure, a method, a computer-readable medium, and an apparatus are provided. The apparatus may be a base station. The apparatus transmits a pre-grant for a downlink transmission to a user equipment (UE), the pre-grant indicating a clear channel assessment (CCA) length based on a contention window size associated at least with a burst length of the downlink transmission. The apparatus receives an acknowledgment of the pre-grant (APG) from the UE when a CCA of the UE based on the CCA length is successful. The apparatus sends the downlink transmission to the UE in response to the APG.

In another aspect of the disclosure, a method, a computer-readable medium, and an apparatus are provided. The apparatus may be a base station. The apparatus performs a clear channel assessment (CCA) based on a contention window associated at least with a burst length for an uplink transmission. The apparatus transmits an uplink grant to a user equipment (UE) when the CCA is successful. The apparatus receives the uplink transmission from the UE in response to the uplink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a diagram illustrating another example of a UE receiving a downlink burst from a base station.

FIGS. 8A and 8B are diagrams illustrating examples of a UE receiving and acknowledging different downlink bursts from a base station.

DETAILED DESCRIPTION

Figure 1:
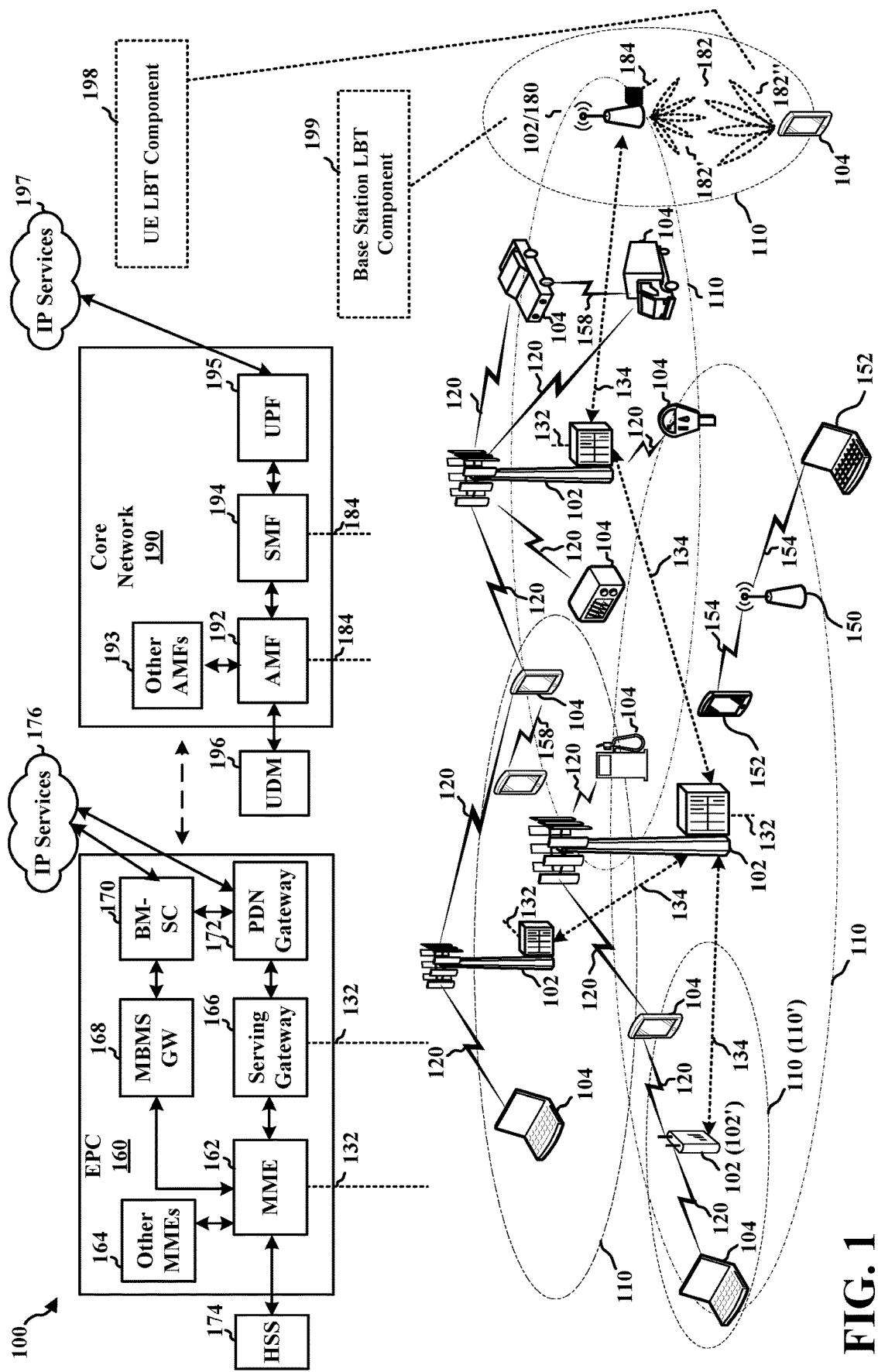
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE LBT component 198 configured to receive a pre-grant for a downlink transmission from a base station, the pre-grant indicating a clear channel assessment (CCA) length based on a contention window size associated at least with a burst length of the downlink transmission; to perform, after receiving the pre-grant, a CCA based on the CCA length; to transmit an acknowledgment of the pre-grant (APG) to the base station when the CCA is successful; and to receive the downlink transmission from the base station in response to the APG. The UE LBT component 198 may also be configured to receive an uplink grant from a base station after a clear channel assessment (CCA) of the base station; and to transmit an uplink transmission to the base station in response to the uplink grant, where the CCA is based on a contention window associated at least with a burst length for the uplink transmission.

Still referring to FIG. 1, in other aspects, the base station 102/180 may include a base station LBT component 199 configured to transmit a pre-grant for a downlink transmission to a user equipment (UE), the pre-grant indicating a clear channel assessment (CCA) length based on a contention window size associated at least with a burst length of the downlink transmission; to receive an acknowledgment of the pre-grant (APG) from the UE when a CCA of the UE based on the CCA length is successful; and to send the downlink transmission to the UE in response to the APG. The base station LBT component 199 may also be configured to perform a clear channel assessment (CCA) based on a contention window associated at least with a burst length for an uplink transmission; to transmit an uplink grant to a user equipment (UE) when the CCA is successful; and to receive the uplink transmission from the UE in response to the uplink grant.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
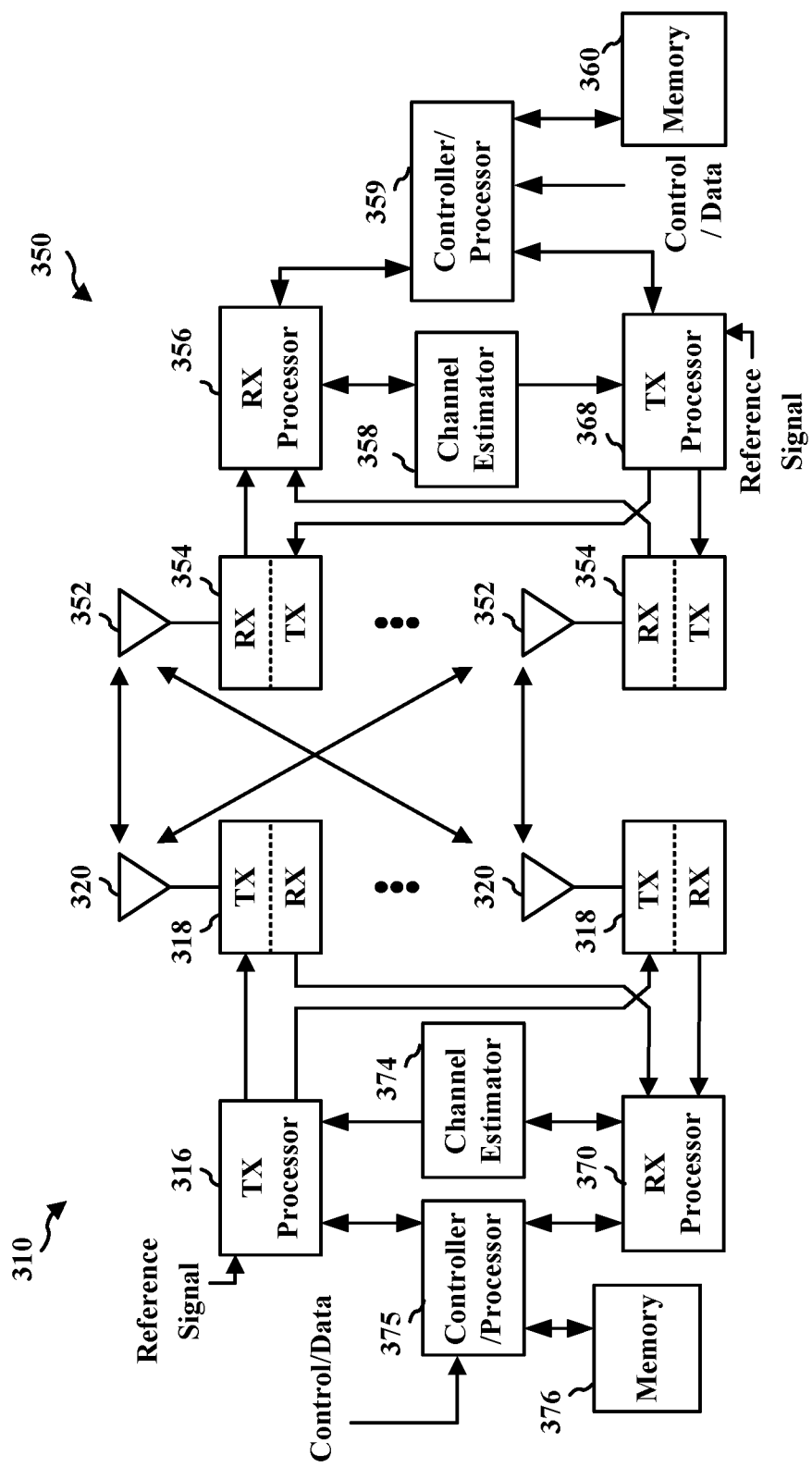
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE LBT component 198 of FIG. 1.

At least one of the TX processor 316, the RX processor 370, and the controller/processor 375 may be configured to perform aspects in connection with base station LBT component 199 of FIG. 1.

In millimeter wave (mmW) links, transmitters and receivers observe different interference patterns due to the highly directional nature of transmissions. As a result, a listen-before-talk (LBT) procedure is generally used to protect the reception of data from interference by other nodes. In LBT, a receiver (e.g. a UE or base station) applies a clear channel assessment (CCA) check before using a channel. The CCA utilizes at least energy detection to determine the presence or absence of other signals on a channel in order to determine if a channel is occupied or clear, respectively. After gaining channel access via a successful LBT operation, the receiver reserves the channel so that other nodes sense the channel to be occupied and therefore refrain from transmitting on the channel. As a result, the data received by the UE or base station may be protected from interference upon gaining access to the channel. Moreover, unnecessary backoff during LBT may be avoided and the receiver may be protected.

Channel access schemes may be classified into several categories, without LBT (Category 1) and with LBT (Categories 2-4). In Category 2 LBT, the UE or base station applies LBT without a random back-off. That is, the duration of time that the channel is sensed to be idle before transmitting on the channel is deterministic (not random). In Category 3 LBT and Category 4 LBT, the UE or base station applies LBT with a random back-off with a contention window of fixed size or variable size, respectively. In this procedure, the UE or base station draws a random number N within a contention window. The size of the contention window is specified by the minimum and maximum value of N. The size of the contention window is fixed in Category 3 LBT, and the size of the contention window can be varied when drawing the random number in Category 4 LBT. For example, the contention window size in Category 4 LBT may be varied based on a channel access priority class (CAPC) or Quality of Service (QoS) of traffic. The random number N is used in the LBT procedure to determine the duration of time that the channel is sensed to be idle before transmitting on the channel.

In Category 2 LBT, the UE or base station applies CCA to detect whether the channel is idle over a fixed period of time. If the channel is sensed busy, the UE or base station refrains from accessing the channel. Otherwise, the UE or base station proceeds to access the channel for a channel occupancy time (COT). In contrast, in Category 3 and 4 LBT (also referred to as long LBT), if the initial CCA is unsuccessful, the UE or base station further applies an extended CCA (eCCA) to detect whether the channel is idle over a random period of time corresponding to the drawn random number within the contention window. The UE or base station waits a defer period (e.g. equal to the period of time for the initial CCA), and then senses whether the channel is busy during the random period of time. If the channel is sensed busy, the UE or base station refrains from accessing the channel and may repeat the eCCA process. Otherwise, the UE or base station proceeds to access the channel for the COT.

Generally, when the UE is receiving downlink data, the base station performs Category 2 LBT and, if successful, transmits a downlink grant scheduling a downlink transmission to the UE. However, although the base station may sense a clear channel due to lack of interference of the base station, the UE may still experience interference and thus may not successfully receive the downlink grant or transmission from the base station. Therefore, to allow the UE to confirm the receiver side channel is clear for reception, the base station may send a pre-grant (PG) to the UE, which is a control signaling message that triggers the UE to perform Category 4 LBT (including eCCA). When the UE receives the PG, the UE performs eCCA and if low or no interference is detected as a result, the UE sends an acknowledgment to the pre-grant (APG) to the base station. The base station may determine from the APG that the UE is in a safe position to receive data, and the base station may subsequently send the downlink grant and downlink transmission in a downlink burst accordingly to the UE. Otherwise, if a high amount of interference is detected, the UE refrains from sending APG (thus declining to receive the scheduling) and the base station determines not to send the downlink burst.

Figure 4:
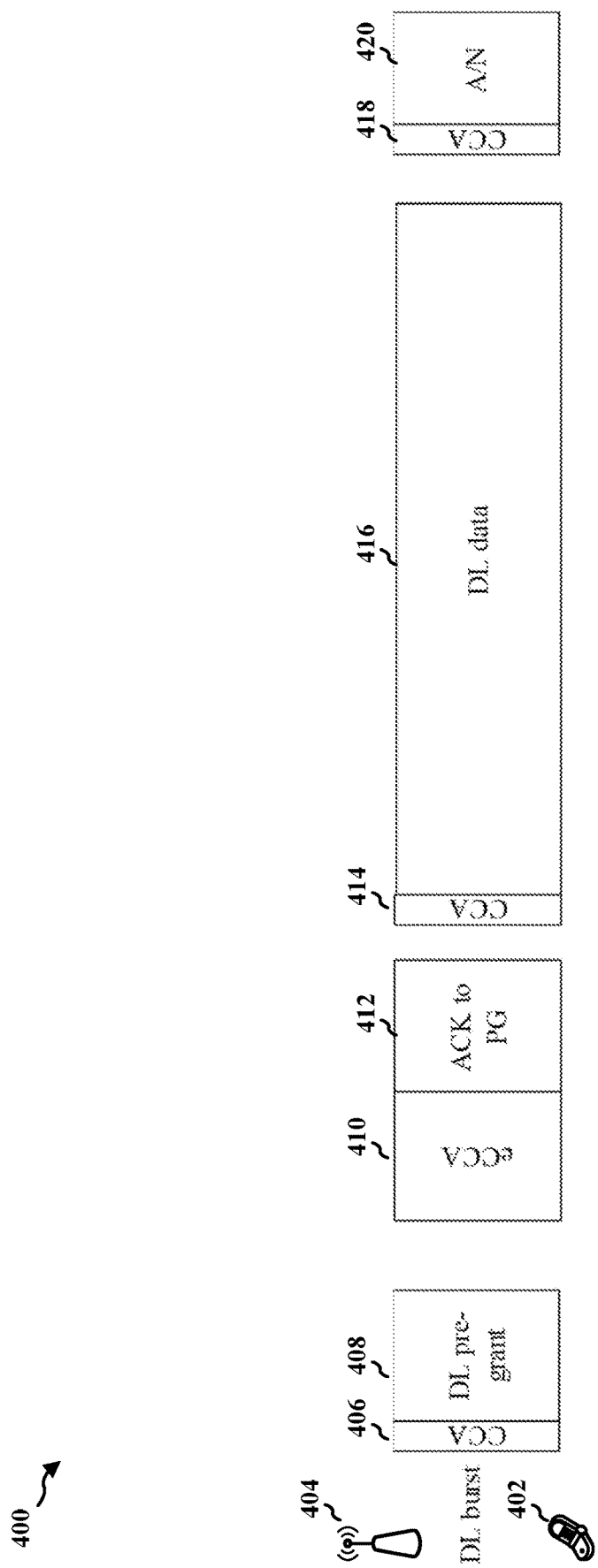
FIG. 4 is a diagram illustrating an example of a UE receiving a downlink burst from a base station.

FIG. 4 illustrates an example diagram 400 of a UE 402 receiving a downlink burst from a base station 404 after sending an APG in response to a PG. The base station performs a CCA 406 (e.g. Category 2 LBT) to determine if the channel is clear for transmission. If the CCA 406 is successful, the base station sends a PG 408 to the UE. After receiving the PG, the UE then performs an eCCA 410 (e.g. Category 4 LBT) to determine if the channel is clear for transmission. If the eCCA 410 is successful, the UE transmits an APG 412 to the base station. When the base station receives the APG, the base station again performs a CCA 414 (e.g. Category 2 LBT) to determine if the channel is clear for transmission, and if the CCA 414 is successful, the base station sends a downlink burst 416 (including a downlink grant and a downlink transmission) to the UE. After receiving the downlink transmission, the UE performs a CCA 418 (e.g. Category 2 LBT) to determine if the channel is clear for transmission, and if the CCA 418 is successful, the UE sends an acknowledgment (ACK)/non-acknowledgment (NACK) feedback 420 to the base station depending on whether the downlink transmission is successfully received.

However, in certain situations, the base station may not receive an APG from the UE. For example, although the UE receives the PG, the UE may fail the Category 4 LBT CCA for APG transmission due to the presence of an interfering transmission (e.g. caused by a jammer). That is, when contending with the jammer for the channel, the UE may fail the CCA and therefore not transmit the APG to the base station. In such case, if the base station does not receive the APG from the UE, the base station will consider the failure to receive the APG an indication that the UE detected a jammer and therefore cannot receive the pre-granted downlink burst. In another example, the UE may not receive the PG, e.g., due to an ongoing transmission from a jammer which interfered with the UE's reception of the PG, or due to link budget constraints, beam management limitations, or control channel rate control restrictions.

For example, FIG. 5 illustrates an example diagram 500 of a UE 502 served by a base station 504 and an aggressor base station 506 serving another UE (not shown). Similar to the example described above with respect to FIG. 4, generally the base station 504 may perform CCA 508 (e.g. Category 2 LBT) and send a PG 510 to the UE if the CCA is successful, and the UE may perform eCCA 512 (e.g. Category 4 LBT) and send an APG 514 to the base station if the CCA is successful. If the base station receives the APG, the base station may perform CCA 516 (e.g. Category 2 LBT) and send a DL data burst 518 to the UE if the CCA is successful, and the UE may perform CCA 520 (e.g. Category 2 LBT) and send an ACK/NACK feedback 522 to the base station if the CCA is successful. However, in the case where the aggressor base station 506 simultaneously sends its own transmission 524 to the other UE which interferes with the transmissions of the UE 502, the base station 504 may fail to receive the APG 514 from the UE. While the base station 504 may not be able to distinguish whether failure to receive the APG from the UE was due to failure by the UE to receive the PG or due to failure by the UE to perform the eCCA, the base station 504 may omit sending the downlink burst due to the lack of receiving APG in either event.

In the examples described above, Category 4 LBT may be effective to minimize collisions in sub-7 GHz operation by randomizing the starting time for transmitting on a channel. For example, by having a large contention window, there may be a low probability that a receiver (e.g. the UE 502) may draw the same random number as other nodes, and thus the nodes would likely have different random starting positions in eCCA. Moreover, if other nodes draw a larger random number than the receiver, the receiver's earlier transmission would serve to block the interfering transmissions of other nodes, minimizing chances of collision.

However, in mmW environments, collision may not necessarily be avoided by randomizing the starting time of each node for transmitting on the channel. For example, narrow beams are generally used for transmitting and receiving in mmW, and therefore less nodes may interfere with the receiver (e.g. UE 502). As a result, the receiver and those nodes may be less likely to draw random numbers in eCCA at the same time. Moreover, having a large contention window to reduce collision probability of a large number of nodes may not necessarily be as efficient as in sub-7 GHz operation, since the effective node density may be reduced due to less interfering nodes in mmW. As a result, smaller contention windows may be effectively used for Category 4 LBT in mmW environments.

Yet, although smaller contention windows (e.g. one slot contention windows, also referred to as one-shot LBT) may serve to effectively measure high interference levels in mmW environments (since the same interference level would be sensed from one or multiple measurements although with a small difference in accuracy), larger contention windows may serve to provide higher confidence that interference will be less likely to occur in the near future at the time the receiver (e.g. UE 502) is receiving the downlink burst. When transmissions are received in bursts, interference activity may have a time correlation to the observation slots in the contention window, and therefore the receiver may determine with different levels of confidence whether future interference may occur in the next burst(s). For example, if the receiver measures that X observation slots have no interference, the receiver may determine that the next Y ms will also have no interference. This time correlation may degrade over time (e.g. if Y1<Y2, the next Y1 ms will be more likely to have no interference than the next Y2 ms). Moreover, higher confidence levels may be determined from larger contention windows (e.g. if X1>X2, the next Y ms will be more likely to have no interference based on a similar observation in X1 slots than in X2 slots)

Therefore, to improve LBT in mmW environments based on the aforementioned time correlation, the present disclosure allows the receiver (e.g. UE 502 for downlink or base station 504 for uplink) performing long LBT to associate the size of the contention window with the burst length of the received transmission. For example, the receiver may perform eCCA with a larger contention window when the burst length is larger, and with a smaller contention window when the burst length is shorter. Moreover, based on the aforementioned time correlation, the present disclosure allows the receiver to adjust the maximum burst length and/or contention window size for performing long LBT in subsequent receptions. In this way, the eCCA and/or maximum COT may be adjusted to account for changes in interference activity at the receiver.

For DL bursts, the base station may indicate to the UE in the PG how long the UE should perform long LBT. The base station may indicate a CCA length based on a contention window size associated at least with the burst length of the downlink transmission in the PG. For example, the base station may indicate the random number (e.g. the back off or count down) in the PG. Alternatively or additionally, the base station may indicate the contention window size in the PG. The UE may determine the size of the contention window based on an association of the burst length with the contention window. The association may be preconfigured by a network (e.g. core network 190) or configured by the base station. For example, if the base station sends a DL transmission having a burst length of 10 ms, the associated contention window may be [0 to 511], while if the base station sends a DL transmission having a burst length of 5 ms, the associated contention window may be [0 to 255]. As a result, when performing eCCA, the UE may draw a random number between 0 and 511 or between 0 and 255 depending on the burst length of the downlink data. Other examples of burst lengths and associated contention windows are possible.

Figure 6:
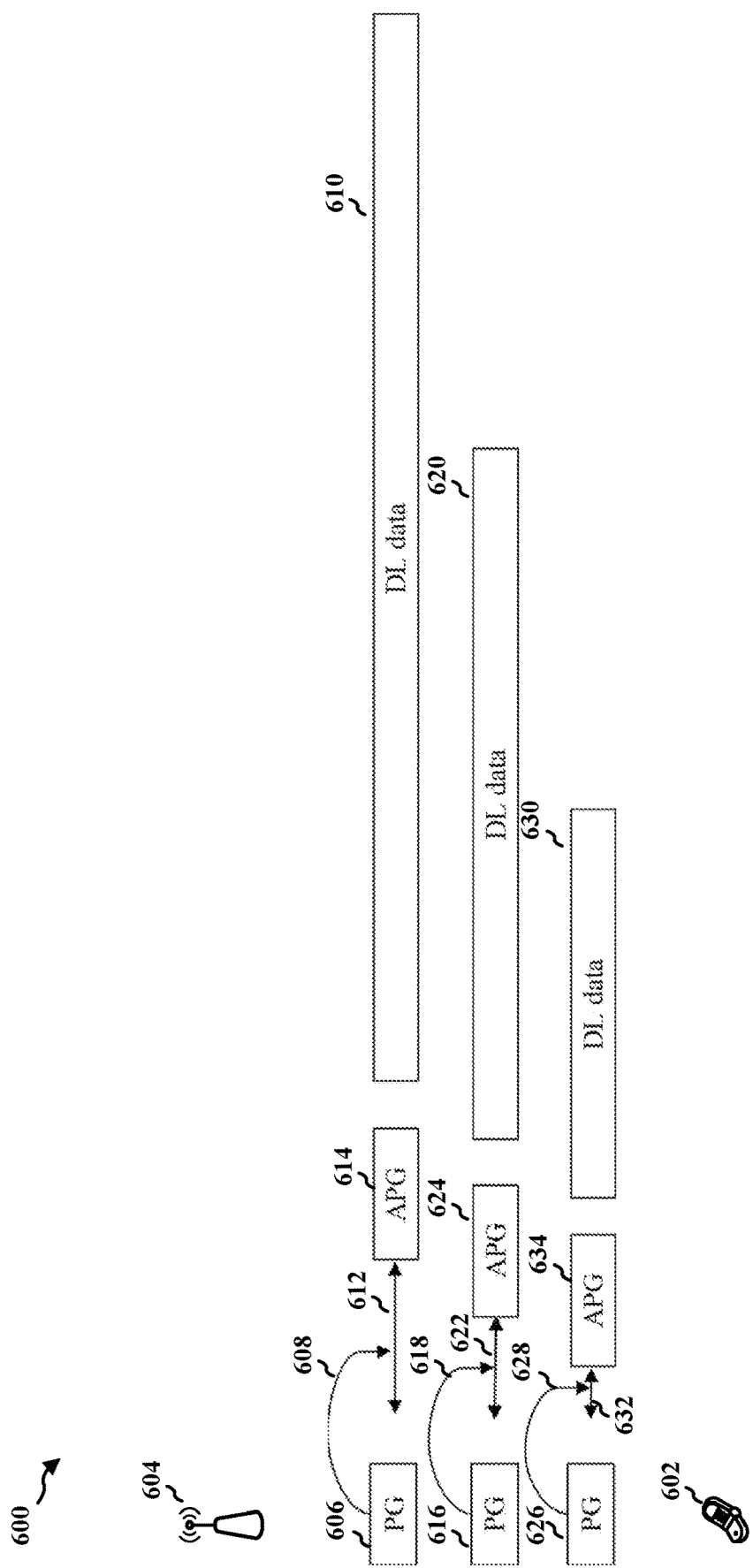
FIG. 6 is a diagram illustrating examples of a UE receiving different downlink bursts from a base station.

FIG. 6 illustrates an example diagram 600 of a UE 602 performing different size LBTs after receiving different lengths of downlink bursts from a base station 604. The base station sends a PG 606 that indicates information 608 regarding an eCCA to be performed by the UE. For example, the PG may indicate a CCA length based on a contention window size associated with at least a burst length of an upcoming downlink transmission 610. In this example, the base station may configure the burst length of the downlink transmission 610 to be 10 ms. The UE then performs eCCA 612 after receiving the PG. For example, the UE may determine a contention window associated with the 10 ms burst length to be [0 to 511] based on a configured association between burst lengths and contention window sizes, and the UE may draw a large random number (e.g. the indicated CCA length) within the contention window. If eCCA is successful (e.g. the UE senses the channel is idle during the number of observation slots corresponding to the drawn random number), the UE transmits an APG 614 to the base station. After receiving the APG, the base station sends the downlink transmission 610 to the UE.

Subsequently (or alternatively), the base station may send a PG 616 that indicates information 618 regarding another eCCA to be performed by the UE. For example, the PG may indicate a CCA length based on a contention window size associated with at least a burst length of an upcoming downlink transmission 620. In this example, the base station may configure the burst length of the downlink transmission 620 to be 5 ms. The UE then performs eCCA 622 after receiving the PG. For example, the UE may determine a contention window associated with the 5 ms burst length to be [0 to 255] based on a configured association between burst lengths and contention window sizes, and the UE may draw a random number (e.g. the indicated CCA length) within the contention window which is smaller than in the previous example. Thus, the number of observation slots the UE measures when performing eCCA 622 is smaller than in eCCA 612. If eCCA is successful, the UE transmits an APG 624 to the base station. After receiving the APG, the base station sends the downlink transmission 620 to the UE.

Lastly (or alternatively), the base station may send a PG 626 that indicates information 628 regarding another eCCA to be performed by the UE. For example, the PG may indicate a CCA length based on a contention window size associated with at least a burst length of an upcoming downlink transmission 630. In this example, the base station may configure the burst length of the downlink transmission 630 to be 2 ms. The UE then performs eCCA 632 after receiving the PG. For example, the UE may determine a contention window associated with the 2 ms burst length to be [0 to 127] based on a configured association between burst lengths and contention window sizes, and the UE may draw a random number (e.g. the indicated CCA length) within the contention window which is smaller than in both previous examples. Thus, the number of observation slots the UE measures when performing eCCA 632 is smaller than in eCCAs 612 and 622. If eCCA is successful, the UE transmits an APG 634 to the base station. After receiving the APG, the base station sends the downlink transmission 630 to the UE.

For UL bursts, the base station performs long LBT prior to sending an uplink grant that schedules an uplink transmission with a configured burst length from the UE. The base station may determine the size of the contention window at least based on an association of the burst length of the uplink transmission with the contention window. The association may be preconfigured by a network (e.g. core network 190) or configured by the base station. For example, if the UE sends an UL transmission having a burst length of 10 ms, the associated contention window may be [0 to 511] in one example, while if the UE sends an UL transmission having a burst length of 5 ms, the associated contention window may be [0 to 255] in another example. As a result, when performing eCCA, the base station may draw a random number between 0 and 511 or between 0 and 255 depending on the burst length of the uplink data in these examples. Other examples of burst lengths and associated contention windows are possible.

Figure 7:
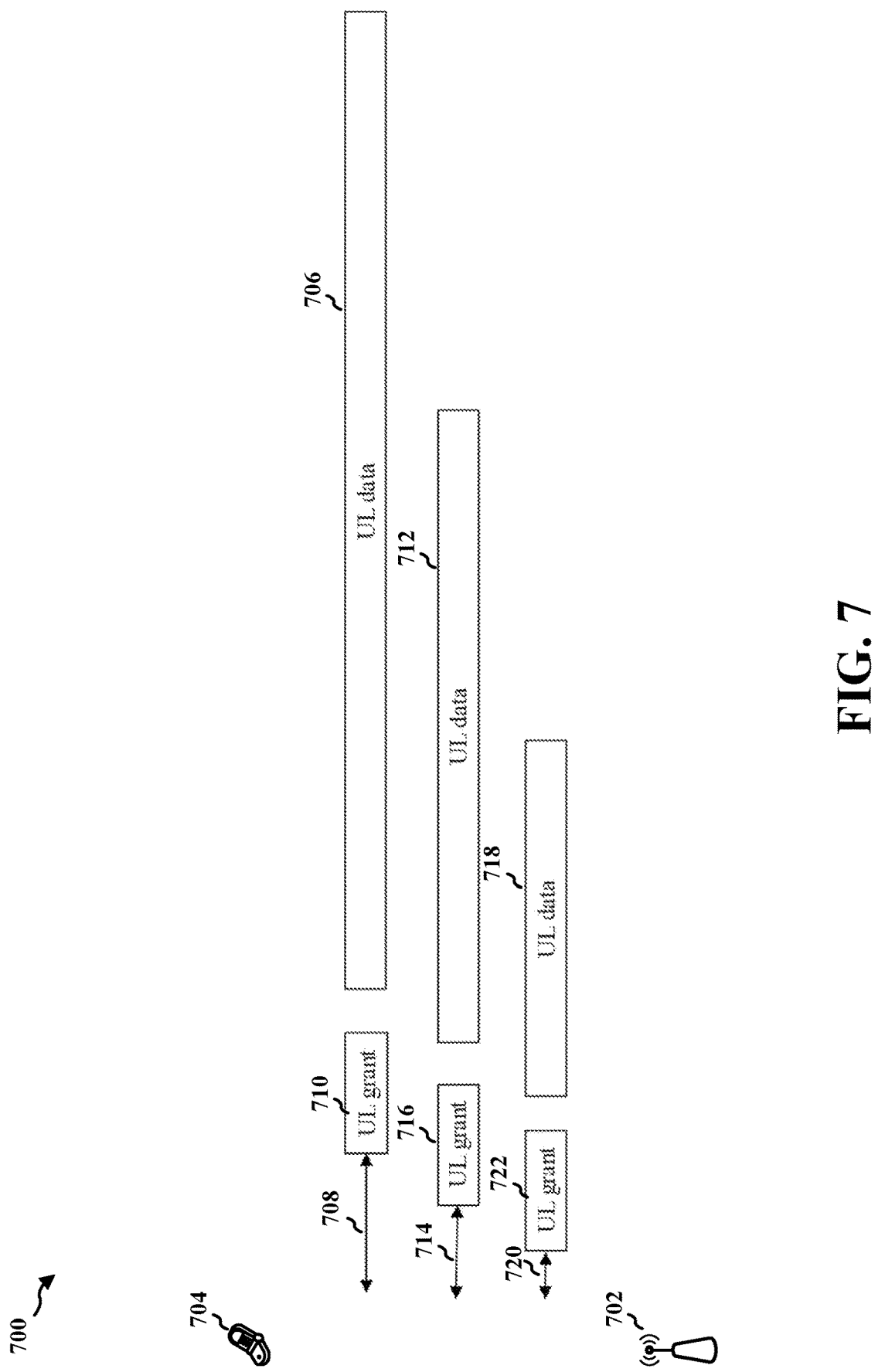
FIG. 7 is a diagram illustrating examples of a base station receiving different uplink bursts from a UE.

FIG. 7 illustrates an example diagram 700 of a base station 702 performing different size LBTs prior to sending uplink grants scheduling different lengths of uplink bursts from a UE 704. The base station may determine a burst length of a planned uplink transmission 706. For example, the base station may configure the burst length of the uplink transmission 706 to be 10 ms. The base station then performs eCCA 708 after determining the burst length. For example, the base station may determine a contention window associated with the 10 ms burst length to be [0 to 511] at least based on a configured association between burst lengths and contention window sizes, and the base station may draw a large random number within the contention window. If eCCA is successful (e.g. the base station senses the channel is idle during the number of observation slots corresponding to the drawn random number), the base station transmits an uplink grant 710 to the UE. The base station then receives the uplink transmission 706 from the UE.

Subsequently (or alternatively), the base station may determine a burst length of another planned uplink transmission 712. For example, the base station may configure the burst length of the uplink transmission 712 to be 5 ms. The base station then performs eCCA 714 after determining the burst length. For example, the base station may determine a contention window associated with the 5 ms burst length to be [0 to 255] at least based on a configured association between burst lengths and contention window sizes, and the base station may draw a random number within the contention window which is smaller than in the previous example. Thus, the number of observation slots the base station measures when performing eCCA 714 may be smaller than in eCCA 708. If eCCA is successful, the base station transmits an uplink grant 716 to the UE. The base station then receives the uplink transmission 712 from the UE.

Lastly (or alternatively), the base station may determine a burst length of another planned uplink transmission 718. For example, the base station may configure the burst length of the uplink transmission 718 to be 2 ms. The base station then performs eCCA 720 after determining the burst length. For example, the base station may determine a contention window associated with the 2 ms burst length to be [0 to 127] at least based on a configured association between burst lengths and contention window sizes, and the base station may draw a random number within the contention window which is smaller than in both previous examples. Thus, the number of observation slots the base station measures when performing eCCA 720 may be smaller than in eCCAs 708 and 714. If eCCA is successful, the base station transmits an uplink grant 722 to the UE. The base station then receives the uplink transmission 718 from the UE.

In the above examples, the receiver (e.g. UE 602 or base station 702) performs LBT with different size contention windows depending on the burst length of the upcoming transmission (downlink or uplink). Generally, the larger the contention window size (e.g. the more measurements that determine whether the channel is clear), the more confidence the receiver may have that the channel will be clear for a larger amount of time in the future. Therefore, larger contention windows may be associated with larger downlink or uplink bursts, and similarly, smaller contention windows may be associated with smaller downlink or uplink bursts. However, notwithstanding the confidence that an upcoming downlink or uplink burst will be clear, interference activity at the receiver may still occur which may cause the receiver to fail to successfully decode the transmission. In such cases, the receiver may notify the transmitter of the error event (e.g. that the transmission was unsuccessfully received), by sending NACK feedback.

To address these error events, the base station may adjust the maximum downlink or uplink burst length (e.g. maximum COT) and/or the size of the contention window, and the receiver (e.g. the UE for downlink or the base station for uplink) may apply the adjusted maximum burst length or the adjusted contention window when performing LBT for receiving a subsequent transmission. The maximum burst length or contention window may be adjusted based on the feedback from the error event. For example, after the UE (e.g. UE 602) receives a downlink transmission from the base station, the UE may send an ACK/NACK feedback to the base station indicating which slot(s) in the downlink transmission were successfully received (ACK) and unsuccessfully received (NACK), and the base station may adjust the maximum downlink burst length or contention window depending on the feedback received. Similarly, in another example, after the base station (e.g. base station 702) receives an uplink transmission from the UE, the base station may determine which slot(s) in the uplink transmission were successfully received or unsuccessfully received, and the base station may adjust the maximum uplink burst length or contention window accordingly.

When determining which slot(s) in the downlink transmission or uplink transmission (e.g. the COT) are successfully or unsuccessfully received, the base station applies a reference duration to the transmission which includes the slot(s) of the transmission to be tested (e.g. for NACK). Although placing the reference duration at the beginning of the COT may facilitate testing for current collision, such placement may not be as effective as at the end of the COT when testing for confidence or likelihood of no future collisions (based on the aforementioned time correlation). Therefore, in the present disclosure, the base station applies the reference duration to the end of the COT. For example, when the UE receives a PDSCH transmission, the UE may determine whether it successfully or unsuccessfully decodes the last slot in the PDSCH transmission, and sends ACK/NACK feedback indicating whether that slot the PDSCH transmission is ACK or NACK. The base station may then determine whether the feedback corresponding to the last slot in the PDSCH transmission is ACK or NACK, and adjusts the maximum COT for subsequent downlink transmissions or the contention window for the UE to perform subsequent eCCA accordingly. Similarly, when the UE sends a PUSCH transmission, the base station may determine whether it successfully or unsuccessfully decodes the last slot in the PUSCH transmission, and adjusts the maximum COT for subsequent uplink transmissions or the contention window for the base station to perform subsequent eCCA accordingly. After receiving the PUSCH transmission, the base station may send feedback to the UE by toggling (for ACK) or not toggling (for NACK) a new data indicator (NDI) in a subsequent uplink grant.

When the receiver determines the decoding result of the PDSCH or PUSCH in the reference duration of the COT, the base station may adjust the maximum COT length and/or the contention window size. In one example, the base station may not change the maximum COT length (e.g. the maximum burst length for a subsequent transmission will be the same as for a prior transmission), but the base station may change the size of the contention window depending on the error event. For instance, if the reference duration is one slot and indicates NACK, or if the reference duration is multiple slots and at least a threshold number of those slots indicates NACK, the base station may increase (e.g. double) the contention window size for subsequent LBT. In contrast, if the reference duration is one slot and indicates ACK, or if the reference duration is multiple slots and at least a threshold number of those slots indicates ACK, the base station may reduce (e.g. reset to the minimum) the contention window size for subsequent LBT.

In another example, the base station may not change the contention window size, but the base station may change the maximum COT length depending on the error event. For instance, if the reference duration is one slot and indicates NACK, or if the reference duration is multiple slots and at least a threshold number of those slots indicates NACK, the base station may reduce (e.g. halve) the contention window size for subsequent LBT. In contrast, if the reference duration is one slot and indicates ACK, or if the reference duration is multiple slots and at least a threshold number of those slots indicates ACK, the base station may increase (e.g. reset to the maximum) the contention window size for subsequent LBT.

In a further example, the base station may combine the prior two examples by adjusting both the maximum COT length and size of the contention window based on the error event as described above.

FIGS. 8A and 8B illustrate example diagrams 800, 850 of a UE 802, 852 performing LBTs with adjusted contention window sizes after receiving different downlink transmissions from a base station 804, 854 with the same maximum burst length (FIG. 8A), or with the same contention window size after receiving different downlink transmissions from the base station with an adjusted maximum burst length (FIG. 8B). Initially, the base station sends a PG 806, 856 that indicates information regarding an eCCA to be performed by the UE. For example, the PG may indicate a CCA length based on a contention window size associated with at least a maximum burst length of an upcoming downlink transmission 808, 858. In this example, the base station may configure the maximum burst length (e.g. maximum COT) of the downlink transmission 808, 858 to be 10 ms. The UE then performs eCCA 810, 860 after receiving the PG. For example, the UE may determine a contention window associated with the 10 ms maximum burst length to be [0 to 511] based on a configured association between maximum burst lengths and contention window sizes, and the UE may draw a large random number (e.g. the indicated CCA length) within the contention window. If eCCA is successful (e.g. the UE senses the channel is idle during the number of observation slots corresponding to the drawn random number), the UE transmits an APG 812, 862 to the base station. After receiving the APG, the base station sends the downlink transmission 808, 858 to the UE.

When the UE receives the downlink transmission 808, 858, the UE determines whether it successfully or unsuccessfully decodes the data within reference duration 814, 864. For example, reference duration 814, 864 may be the last slot of the PDSCH. In this example, the UE failed to successfully decode the data in this reference duration (e.g. due to new interference activity from an aggressor base station), and therefore the UE transmits a NACK feedback 816, 866 to the base station. When the base station receives the NACK feedback from the UE, the base station determines that the UE failed to receive the data likely due to interference, and therefore the base station in the example of FIG. 8A increases the contention window size for subsequent LBT while keeping the same maximum burst length for subsequent downlink transmissions, and in the example of FIG. 8B decreases the maximum burst length for subsequent downlink transmissions while keeping the same contention window size for subsequent LBT. The base station may then send the adjusted contention window size or adjusted maximum burst length to the UE (e.g. in the PG).

Subsequently, the base station may send a PG 818, 868 that indicates information regarding another eCCA to be performed by the UE. For example, the PG may indicate a CCA length based on a contention window size associated with at least the adjusted maximum burst length for an upcoming downlink transmission 870 or a CCA length based on the adjusted contention window size for performing eCCA prior to receiving the upcoming downlink transmission 820. In the example of FIG. 8A, the base station may again configure the maximum burst length of the downlink transmission 820 to be 10 ms. The UE then performs eCCA 822 after receiving the PG. For example, the UE may determine the contention window associated with the 10 ms burst length to be [0 to 1023] based on the adjusted contention window size, and the UE may draw a random number (e.g. the indicated CCA length) within the contention window which is larger than in the previous example. If eCCA is successful, the UE transmits an APG 824 to the base station. After receiving the APG, the base station sends the downlink transmission 820 to the UE.

In the example of FIG. 8B, the base station may adjust the maximum burst length of the downlink transmission to be 5 ms, while keeping the contention window size the same. The UE then performs eCCA 872 after receiving the PG. For example, the UE may determine the contention window associated with the 5 ms burst length to remain at [0 to 511] based on the adjusted maximum burst length, and the UE may draw a random number (e.g. the indicated CCA length) within the contention window similar to the previous example. If eCCA is successful, the UE transmits an APG 874 to the base station. After receiving the APG, the base station sends the downlink transmission 870 to the UE.

When the UE receives the downlink transmission 820, 870 the UE determines whether it successfully or unsuccessfully decodes the data within the reference duration. In this example, the UE succeeds in decoding the data in the reference duration (e.g. due to lack of interference activity from an aggressor base station), and therefore the UE transmits an ACK feedback 826, 876 to the base station. When the base station receives the ACK feedback from the UE, the base station determines that the UE successfully received the data likely due to absence of interference, and therefore the base station in the example of FIG. 8A resets the contention window size for subsequent LBT while keeping the same maximum burst length for subsequent downlink transmissions, and in the example of FIG. 8B increases the maximum burst length for subsequent downlink transmissions while keeping the same contention window size for subsequent LBT. The base station may then send the adjusted contention window size or adjusted maximum burst length to the UE (e.g. in the PG).

Lastly, the base station may send a PG 828, 878 that indicates information regarding another eCCA to be performed by the UE. For example, the PG may indicate a CCA length based on a contention window size associated with at least the adjusted maximum burst length for an upcoming downlink transmission 880 or a CCA length based on the adjusted contention window size for performing eCCA prior to receiving the upcoming downlink transmission 830. In the example of FIG. 8A, the base station may again configure the maximum burst length of the downlink transmission 830 to be 10 ms. The UE then performs eCCA 832 after receiving the PG. For example, the UE may determine the contention window associated with the 10 ms burst length to be [0 to 7] based on the adjusted contention window size, and the UE may draw a random number (e.g. the indicated CCA length) within the contention window which is smaller than in the previous example. If eCCA is successful, the UE transmits an APG 834 to the base station. After receiving the APG, the base station sends the downlink transmission 830 to the UE.

In the example of FIG. 8B, the base station may adjust the maximum burst length of the downlink transmission to be 15 ms, while keeping the contention window size the same. The UE then performs eCCA 882 after receiving the PG. For example, the UE may determine the contention window associated with the 15 ms burst length to remain at [0 to 511] based on the adjusted maximum burst length, and the UE may draw a random number (e.g. the indicated CCA length) within the contention window similar to the previous examples. If eCCA is successful, the UE transmits an APG 884 to the base station. After receiving the APG, the base station sends the downlink transmission 880 to the UE.

Thus, FIGS. 8A and 8B illustrate downlink examples where the contention window size or maximum burst length may be adjusted based on interference activity. The above described process is similar for uplink. For example, referring to FIG. 7, the base station 702 may perform LBT with adjusted contention window sizes prior to sending uplink grants 710, 716, 722 scheduling uplink bursts 706, 712, 718 from a UE 704 with the same maximum burst length (similar to FIG. 8A), or with the same contention window size prior to sending uplink grants 710, 716, 722 scheduling uplink bursts 706, 712, 718 from the UE with an adjusted maximum burst length (similar to FIG. 8B). The base station may determine a maximum burst length of a planned uplink transmission 706, 712, 718 and perform eCCA 708, 714, 720 after determining the maximum burst length. If eCCA is successful, the base station transmits the uplink grant 710, 716, 722 to the UE and then receives the uplink transmission 706, 712, 718 from the UE. When the base station receives the uplink transmission, the base station determines whether it successfully or unsuccessfully decodes the data within the reference duration (e.g. at the end of the COT). Depending on whether the base station succeeds or fails to decode the data in the reference duration, the base station may adjust the contention window size for subsequent LBT while keeping the same maximum burst length for subsequent uplink transmissions (similar to FIG. 8A) or adjust the maximum burst length for subsequent uplink transmissions while keeping the same contention window size for subsequent LBT (similar to FIG. 8B).

Figure 9:
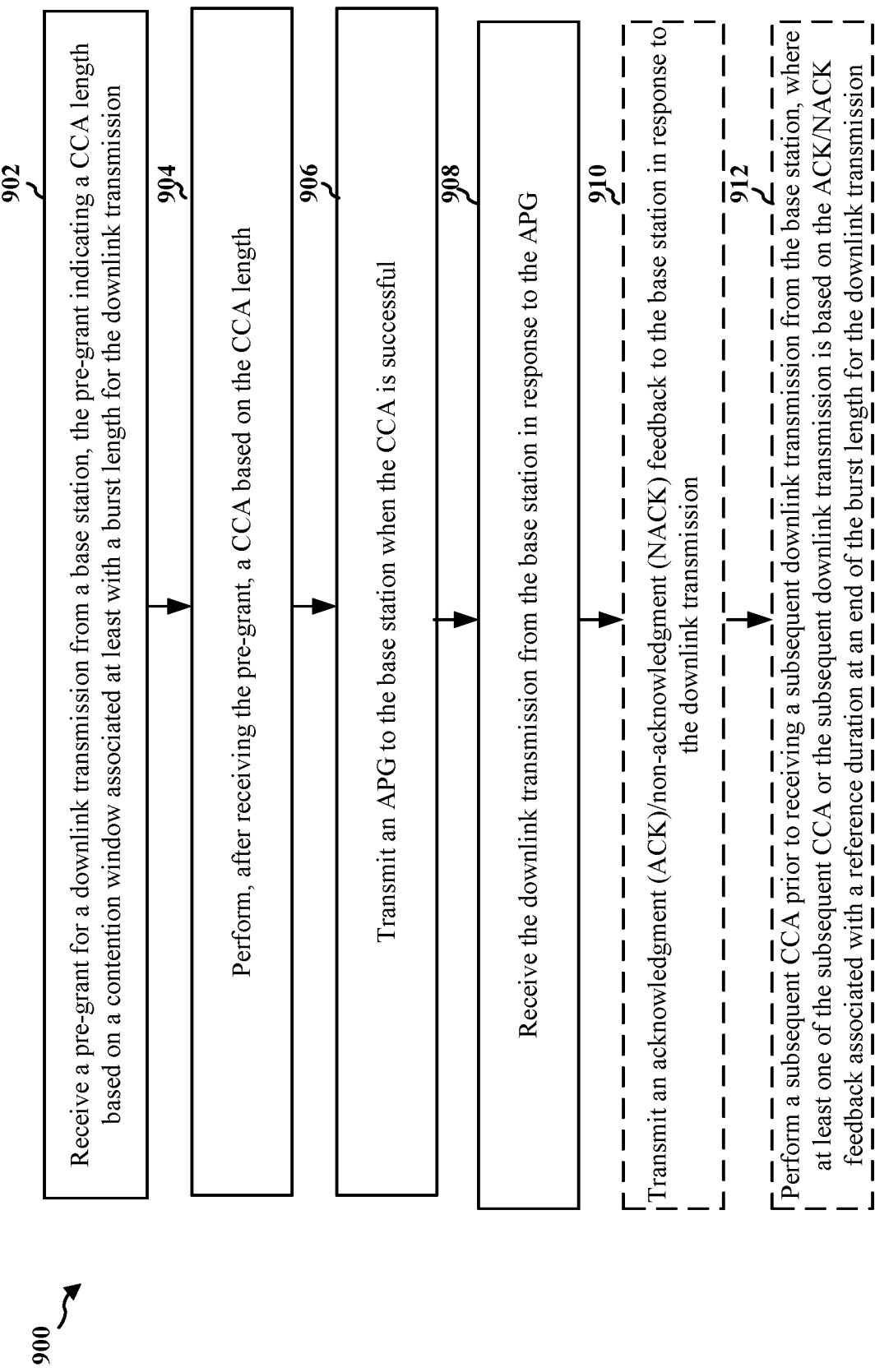
FIG. 9 is a flowchart of a method of wireless communication of a UE receiving downlink data.

FIG. 9 is a flowchart 900 of a method of wireless communication. The method may be performed by a UE (e.g., the UE 104, 350, 402, 502, 602, 704, 802, 852, which may include the memory 360 and which may be the entire UE 350 or a component of the UE 350, such as the TX processor 368, the RX processor 356, and/or the controller/processor 359). Optional aspects are illustrated in dashed lines. The method allows for improved receiver-based LBT for downlink transmissions.

At 902, the UE receives a pre-grant for a downlink transmission from a base station, the pre-grant indicating a CCA length based on a contention window size associated at least with a burst length of the downlink transmission.

At 904, the UE performs, after receiving the pre-grant, a CCA based on the CCA length. The CCA length may comprise a backoff within the contention window for the UE to apply when performing the CCA.

At 906, the UE transmits an acknowledgment of the pre-grant (APG) to the base station when the CCA is successful.

At 908, the UE receives the downlink transmission from the base station in response to the APG.

At 910, the UE transmits an acknowledgment (ACK)/non-acknowledgment (NACK) feedback to the base station in response to the downlink transmission.

At 912, the UE performs a subsequent CCA prior to receiving a subsequent downlink transmission from the base station. At least one of the subsequent CCA or the subsequent downlink transmission may be based on the ACK/NACK feedback associated with a reference duration at an end of the burst length for the downlink transmission. The downlink transmission may be a physical downlink shared channel (PDSCH), and the reference duration may be a last slot of the PDSCH.

In one example, the subsequent downlink transmission may include a same maximum burst length as a maximum burst length for the downlink transmission, and the subsequent CCA may be performed based on an adjusted contention window associated with the same maximum burst length, the adjusted contention window being based on the ACK/NACK feedback associated with the reference duration. The adjusted contention window may be increased when the ACK/NACK feedback associated with the reference duration is a NACK, and the adjusted contention window may be decreased when the ACK/NACK feedback associated with the reference duration is an ACK.

In another example, the subsequent downlink transmission may include an adjusted maximum burst length, the adjusted maximum burst length being based on the ACK/NACK feedback associated with the reference duration. The subsequent CCA may be performed based on a same contention window as the contention window for the downlink transmission. The adjusted maximum burst length may be decreased when the ACK/NACK feedback associated with the reference duration is a NACK, and the adjusted maximum burst length may be increased when the ACK/NACK feedback associated with the reference duration is an ACK.

In a further example, the subsequent downlink transmission may include an adjusted maximum burst length, the subsequent CCA may be performed based on an adjusted contention window associated with the adjusted maximum burst length, and the adjusted maximum burst length and the adjusted contention window may be based on the ACK/NACK feedback associated with the reference duration.

Figure 10:
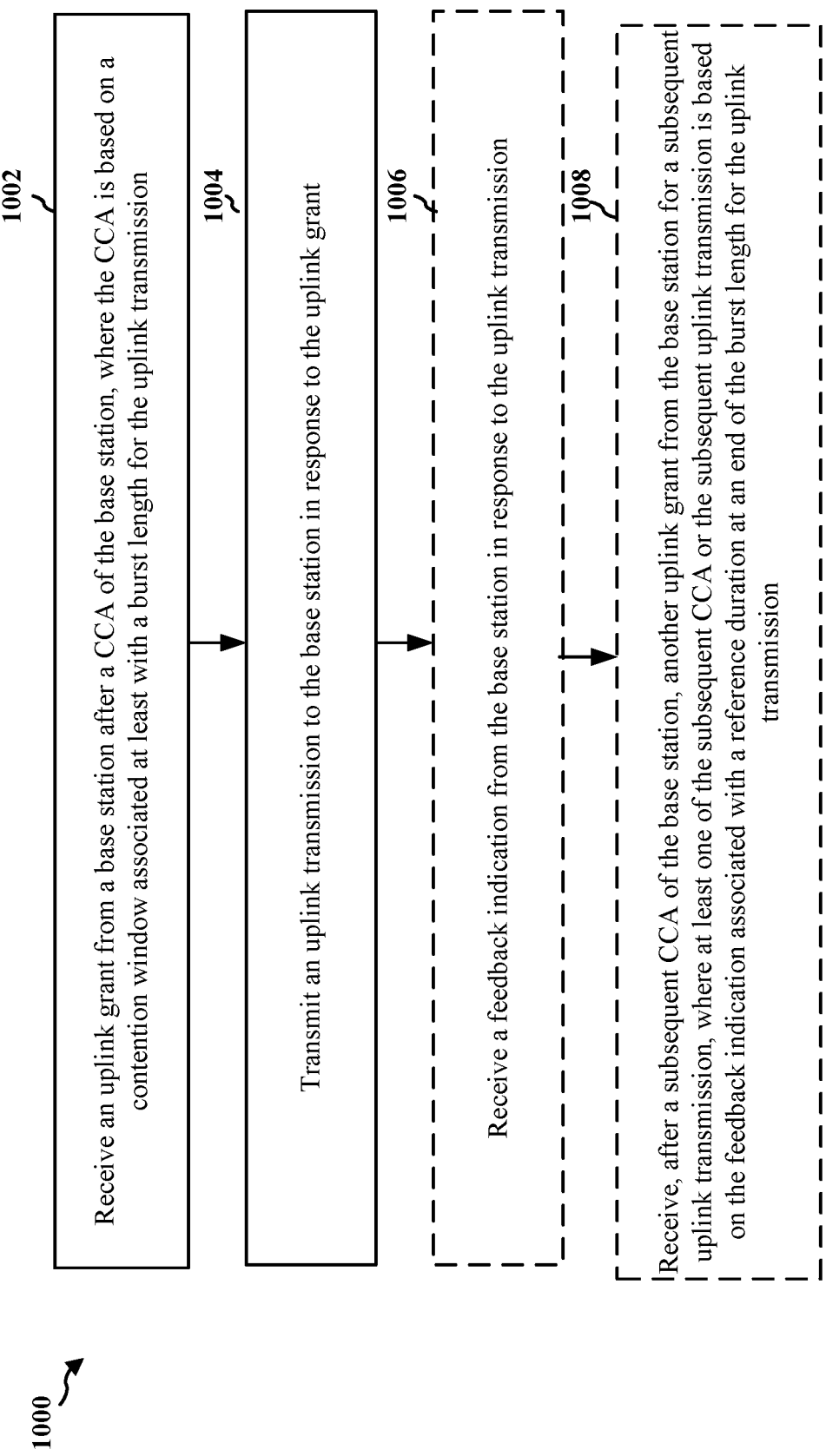
FIG. 10 is a flowchart of a method of wireless communication of a UE transmitting uplink data.

FIG. 10 is a flowchart 1000 of a method of wireless communication. The method may be performed by a UE (e.g., the UE 104, 350, 402, 502, 602, 704, 802, 852, which may include the memory 360 and which may be the entire UE 350 or a component of the UE 350, such as the TX processor 368, the RX processor 356, and/or the controller/processor 359). Optional aspects are illustrated in dashed lines. The method allows for improved receiver-based LBT for uplink transmissions.

At 1002, the UE receives an uplink grant from a base station after a clear channel assessment (CCA) of the base station.

At 1004, the UE transmits an uplink transmission to the base station in response to the uplink grant, where the CCA is based on a contention window associated at least with a burst length for the uplink transmission.

At 1006, the UE receives a feedback indication from the base station in response to the uplink transmission.

At 1008, the UE receives, after a subsequent CCA of the base station, another uplink grant from the base station for a subsequent uplink transmission. At least one of the subsequent CCA or the subsequent uplink transmission may be based on the feedback indication associated with a reference duration at an end of the burst length for the uplink transmission. The uplink transmission may be a physical uplink shared channel (PUSCH), the reference duration may be a last slot of the PUSCH, and the feedback indication may be based on a new data indicator (NDI) in the another uplink grant for a hybrid automatic repeat request (HARQ) process.

In one example, the subsequent uplink transmission may include a same maximum burst length as a maximum burst length for the uplink transmission, and the subsequent CCA may be based on an adjusted contention window associated with the same maximum burst length, the adjusted contention window being based on the feedback indication associated with the reference duration. The adjusted contention window may be increased when the feedback indication associated with the reference duration is a NACK, and the adjusted contention window may be decreased when the feedback indication associated with the reference duration is an ACK.

In another example, the subsequent uplink transmission may include an adjusted maximum burst length, the adjusted maximum burst length being based on the feedback indication associated with the reference duration. The subsequent CCA may be based on a same contention window as the contention window for the uplink transmission. The adjusted maximum burst length may be decreased when the feedback indication associated with the reference duration is a NACK, and the adjusted maximum burst length may be increased when the feedback indication associated with the reference duration is an ACK.

In a further example, the subsequent uplink transmission may include an adjusted maximum burst length, the subsequent CCA may be based on an adjusted contention window associated with the adjusted maximum burst length, and the adjusted maximum burst length and the adjusted contention window may be based on the feedback indication associated with the reference duration.

Figure 11:
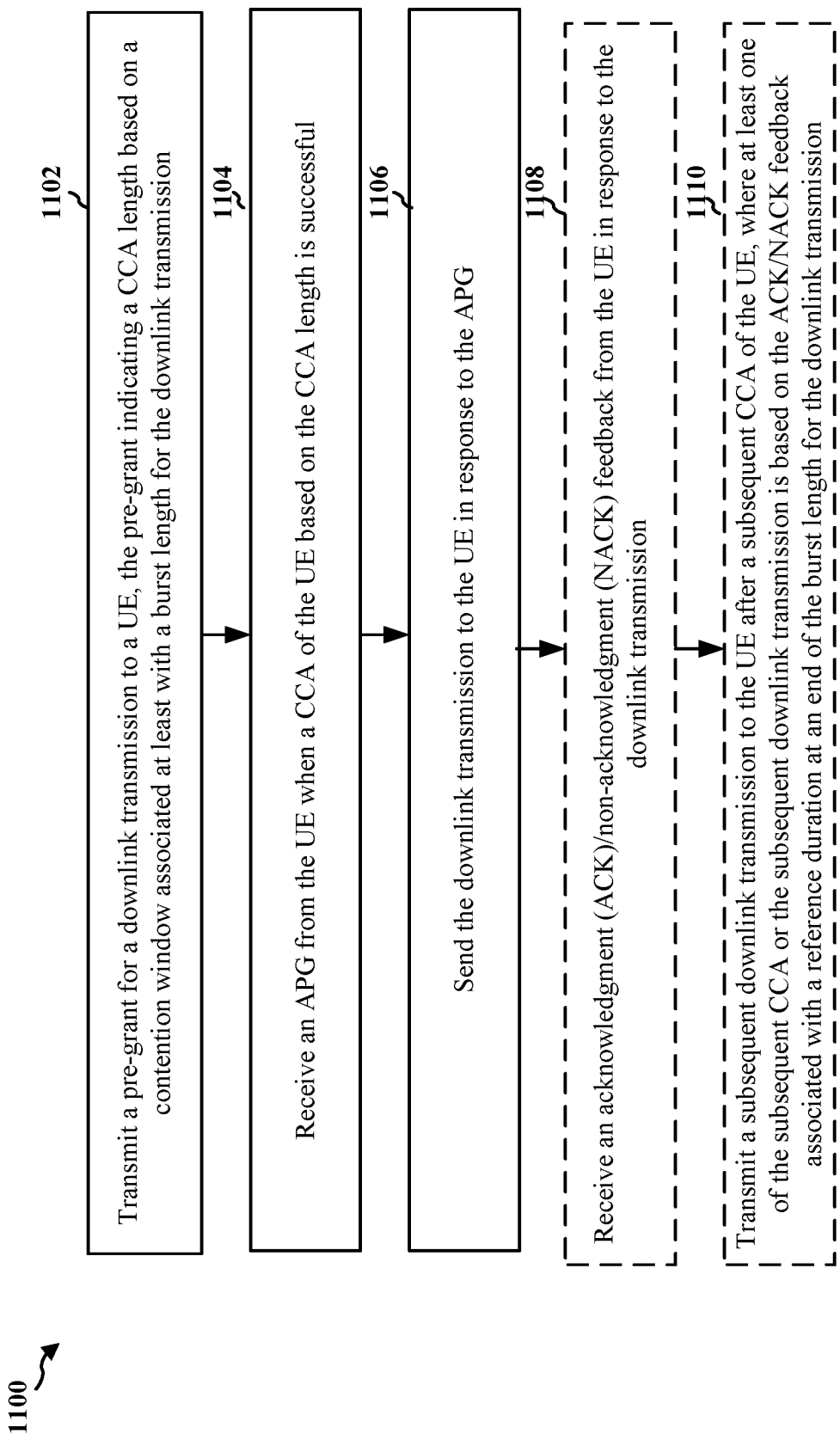
FIG. 11 is a flowchart of a method of wireless communication of a base station transmitting downlink data.

FIG. 11 is a flowchart 1100 of a method of wireless communication. The method may be performed by a base station 310 (e.g., the base station 102/180, 310, 404, 504, 604, 702, 804, 854, which may include the memory 376 and which may be the entire base station 310 or a component of the base station 310, such as the TX processor 316, the RX processor 370, and/or the controller/processor 375). Optional aspects are illustrated in dashed lines. The method allows for improved receiver-based LBT for downlink transmissions.

At 1102, the base station transmits a pre-grant for a downlink transmission to a user equipment (UE), the pre-grant indicating a CCA length based on a contention window size associated at least with a burst length of the downlink transmission.

At 1104, the base station receives an acknowledgment of the pre-grant (APG) from the UE when a CCA of the UE based on the CCA length is successful. The CCA length may comprise a backoff within the contention window for the CCA of the UE.

At 1106, the base station sends the downlink transmission to the UE in response to the APG.

At 1108, the base station receives an acknowledgment (ACK)/non-acknowledgment (NACK) feedback from the UE in response to the downlink transmission.

At 1110, the base station transmits a subsequent downlink transmission to the UE after a subsequent CCA of the UE. At least one of the subsequent CCA or the subsequent downlink transmission may be based on the ACK/NACK feedback associated with a reference duration at an end of the burst length for the downlink transmission. The downlink transmission may be a physical downlink shared channel (PDSCH), and the reference duration may be a last slot of the PDSCH.

In one example, the subsequent downlink transmission may include a same maximum burst length as a maximum burst length for the downlink transmission, and the subsequent CCA may be based on an adjusted contention window associated with the same maximum burst length, the adjusted contention window being based on the ACK/NACK feedback associated with the reference duration. The adjusted contention window may be increased when the ACK/NACK feedback associated with the reference duration is a NACK, and the adjusted contention window may be decreased when the ACK/NACK feedback associated with the reference duration is an ACK.

In another example, the subsequent downlink transmission may include an adjusted maximum burst length, the adjusted maximum burst length being based on the ACK/NACK feedback associated with the reference duration. The subsequent CCA may be based on a same contention window as the contention window for the downlink transmission. The adjusted maximum burst length may be decreased when the ACK/NACK feedback associated with the reference duration is a NACK, and the adjusted maximum burst length may be increased when the ACK/NACK feedback associated with the reference duration is an ACK.

In a further example, the subsequent downlink transmission may include an adjusted maximum burst length, the subsequent CCA may be based on an adjusted contention window associated with the adjusted maximum burst length, and the adjusted maximum burst length and the adjusted contention window may be based on the ACK/NACK feedback associated with the reference duration.

Figure 12:
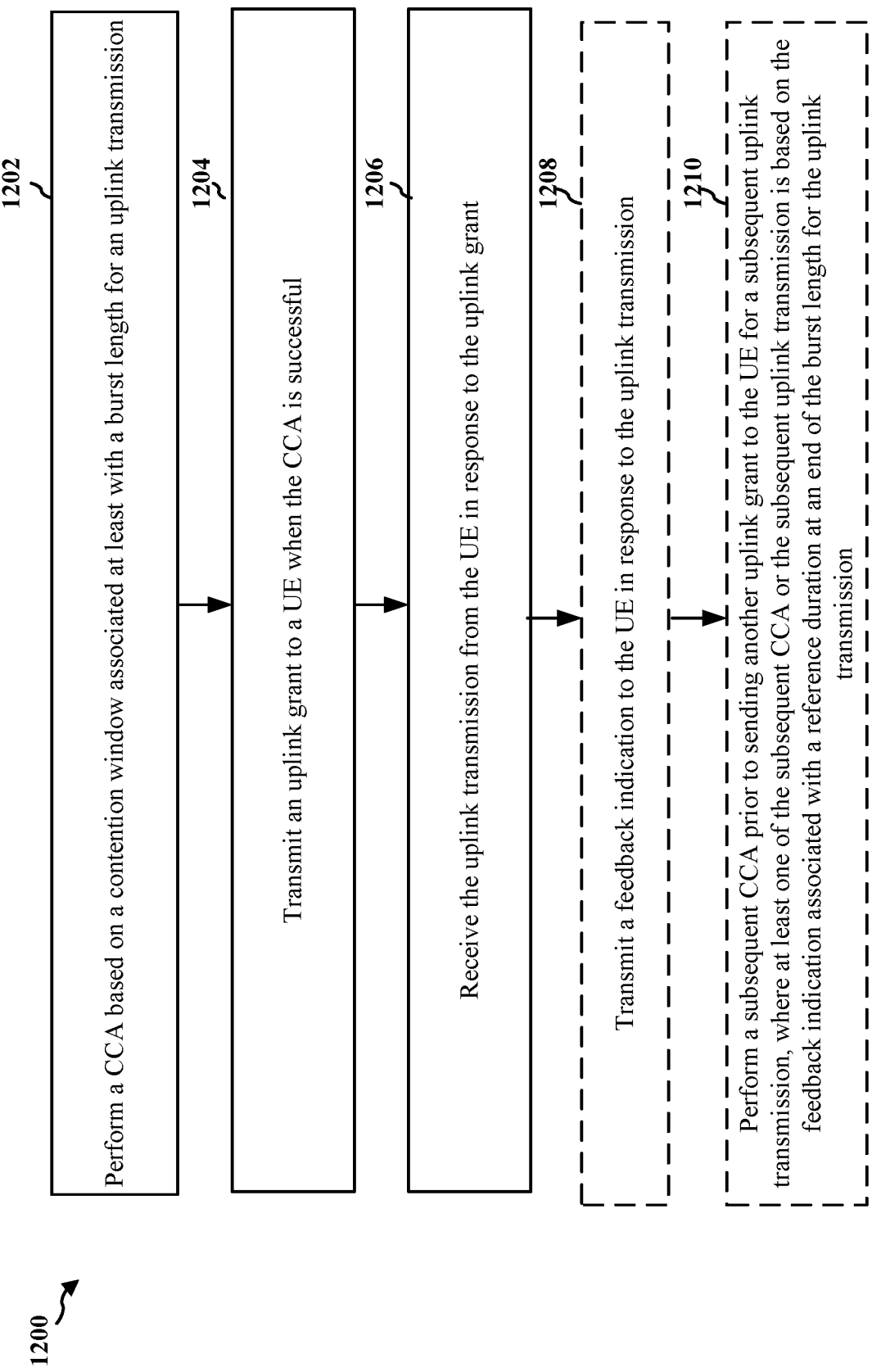
FIG. 12 is a flowchart of a method of wireless communication of a base station receiving uplink data.

FIG. 12 is a flowchart 1200 of a method of wireless communication. The method may be performed by a base station 310 (e.g., the base station 102/180, 310, 404, 504, 604, 702, 804, 854, which may include the memory 376 and which may be the entire base station 310 or a component of the base station 310, such as the TX processor 316, the RX processor 370, and/or the controller/processor 375). Optional aspects are illustrated in dashed lines. The method allows for improved receiver-based LBT for uplink transmissions.

At 1202, the performs a clear channel assessment (CCA) based on a contention window associated at least with a burst length for an uplink transmission.

At 1204, the base station transmits an uplink grant to a user equipment (UE) when the CCA is successful.

At 1206, the base station receives the uplink transmission from the UE in response to the uplink grant.

At 1208, the base station transmits a feedback indication to the UE in response to the uplink transmission At 1210, the base station performs a subsequent CCA prior to sending another uplink grant to the UE for a subsequent uplink transmission. At least one of the subsequent CCA or the subsequent uplink transmission may be based on the feedback indication associated with a reference duration at an end of the burst length for the uplink transmission. The uplink transmission may be a physical uplink shared channel (PUSCH), the reference duration may be a last slot of the PUSCH, and the feedback indication may be based on a new data indicator (NDI) in the another uplink grant for a hybrid automatic repeat request (HARQ) process.

In one example, the subsequent uplink transmission may include a same maximum burst length as a maximum burst length for the uplink transmission, and the subsequent CCA may be performed based on an adjusted contention window associated with the same maximum burst length, the adjusted contention window being based on the feedback indication associated with the reference duration. The adjusted contention window may be increased when the feedback indication associated with the reference duration is a NACK, and the adjusted contention window may be decreased when the feedback indication associated with the reference duration is an ACK.

In another example, the subsequent uplink transmission may include an adjusted maximum burst length, the adjusted maximum burst length being based on the feedback indication associated with the reference duration. The subsequent CCA may be performed based on a same contention window as the contention window for the uplink transmission. The adjusted maximum burst length may be decreased when the feedback indication associated with the reference duration is a NACK, and the adjusted maximum burst length may be increased when the feedback indication associated with the reference duration is an ACK.

In a further example, the subsequent uplink transmission may include an adjusted maximum burst length, the subsequent CCA may be performed based on an adjusted contention window associated with the adjusted maximum burst length, and the adjusted maximum burst length and the adjusted contention window may be based on the feedback indication associated with the reference duration.

Figure 13:
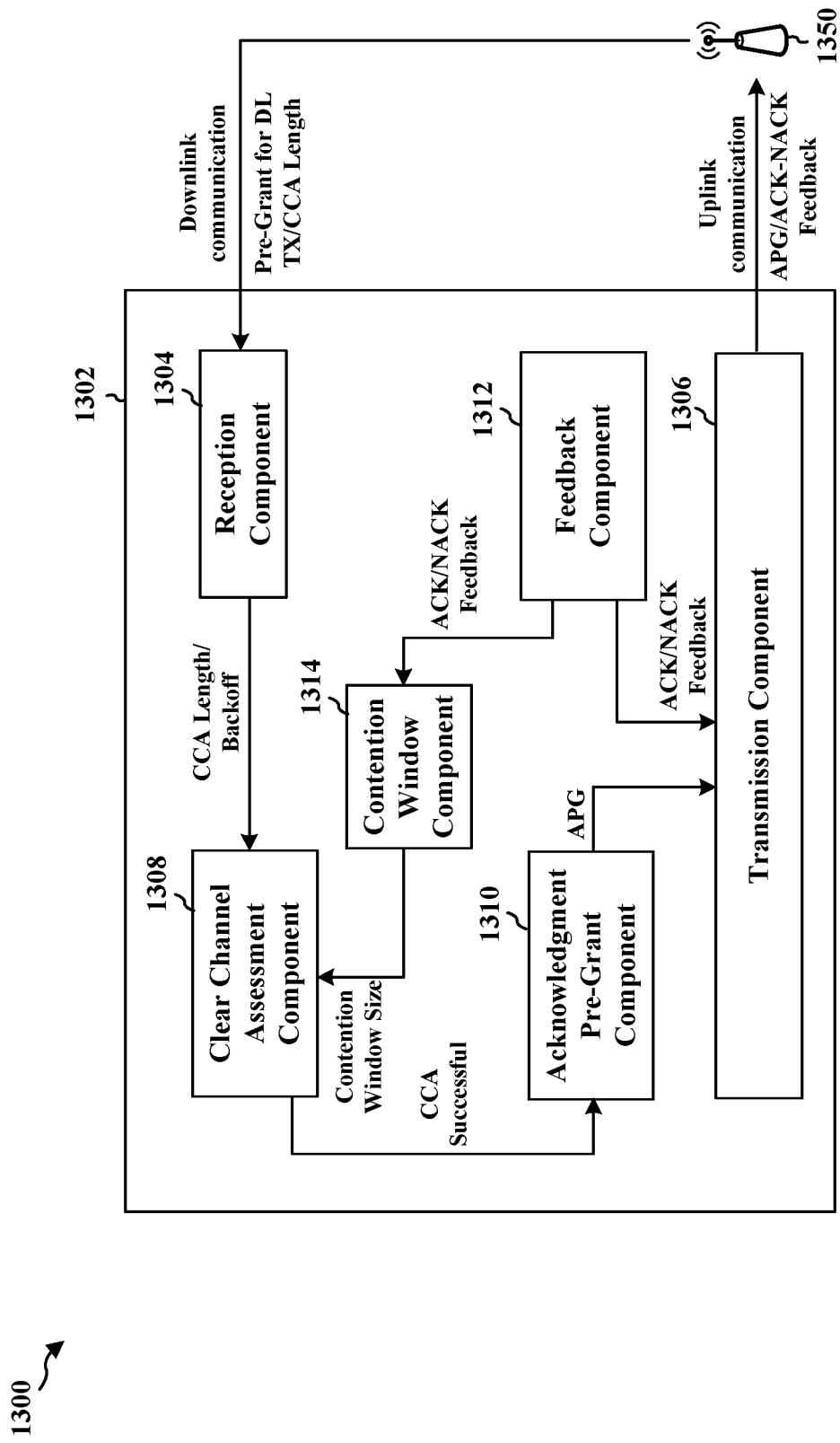
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 502, 602, 704, 802, 852) in wireless communication with base station 1350.

The apparatus includes a reception component 1304 that receives downlink communication from the base station 1350. The reception component 1304 may be configured to receive signals and/or other information from other devices including, e.g., base station 1350. The signals/information received by the reception component 1304 may be provided to one or more components of the apparatus 1302 for further processing and use in performing various operations in accordance with the methods discussed supra including the processes of the aforementioned flowcharts 900 and 1000. Thus, via the reception component 1304, the apparatus 1302 and/or one or more components therein receive signals and/or other information (e.g., such as downlink data for the apparatus 1302 and/or other control signaling) from the base station 1350 as discussed supra and also discussed more specifically infra.

In some aspects, the reception component 1304 is configured to receive, from the BS, receive a pre-grant for a downlink transmission from a base station, e.g., as described in connection with block 902 of FIG. 9. In some aspects, the pre-grant indicates a CCA length based on a contention window size associated at least with a burst length of a downlink transmission, e.g., as described in connection with block 902 of FIG. 9. In some aspects, the reception component 1304 is also configured to receive a downlink transmission from the base station in response to the APG, e.g., as described in connection with block 908 of FIG. 9. In some aspects, the reception component 1304 is also configured to receive, from the BS, a subsequent downlink transmission. In some aspects, the subsequent downlink transmission includes a same maximum burst length as a maximum burst length for the downlink transmission. In some aspects, the subsequent downlink transmission is based on the ACK/NACK feedback associated with a reference duration at an end of the burst length for the downlink transmission. In some aspects, the downlink transmission is a PDSCH, and the reference duration is a last slot of the PDSCH. In some aspects, the reception component 1304 is configured to receive an uplink grant from a base station after a CCA of the base station, e.g., as described in connection with block 1002 of FIG. 10. In some aspects, the reception component 1304 is configured to receive, after a subsequent CCA of the base station, another uplink grant from the base station for a subsequent uplink transmission, e.g., as described in connection with block 1008 of FIG. 10. In some aspects, the subsequent downlink transmission includes an adjusted maximum burst length. In some aspects, the adjusted maximum burst length is based on the feedback indication, such as the ACK/NACK feedback, associated with the reference duration. For example, the adjusted maximum burst length is decreased when the ACK/NACK feedback associated with the reference duration is a NACK. In another example, the adjusted maximum burst length is increased when the ACK/NACK feedback associated with the reference duration is an ACK.

The apparatus includes a clear channel assessment component 1308 configured to perform, after receiving the pre-grant, a CCA based on the CCA length, e.g., as described in connection with block 904 of FIG. 9. In some aspects, the CCA length comprises a backoff within the contention window size for the UE to apply when performing the CCA. In some aspects, the clear channel assessment component 1308 performs the CCA is based on a contention window associated at least with a burst length for the uplink transmission. The clear channel assessment component 1308 is also configured to perform a subsequent CCA prior to receiving a subsequent downlink transmission from the base station, e.g., as described in connection with block 912 of FIG. 9. In some aspects, the subsequent CCA is performed based on an adjusted contention window associated with the same maximum burst length. In other aspects, the subsequent CCA is performed based on a same contention window size as the contention window size for the downlink transmission. In other aspects, the subsequent CCA is based on a same contention window as the contention window for the uplink transmission. In some aspects, the subsequent CCA is based on the ACK/NACK feedback associated with a reference duration at an end of the burst length for the downlink transmission.

The apparatus includes an acknowledgment pre-grant component 1310 configured to transmit an acknowledgment of the pre-grant (APG) to the base station when the CCA is successful, e.g., as described in connection with block 906 of FIG. 9.

The apparatus includes a feedback component 1312 configured to receive a feedback indication from the base station in response to the uplink transmission, e.g., as described in connection with block 1006 of FIG. 10. In some aspects, the feedback indication is based on a new data indicator (NDI) in the another uplink grant for a hybrid automatic repeat request (HARQ) process.

The apparatus includes a contention window component 1314 configured to determine a contention window. In some aspects, the contention window component 1314 is also configured to determine an adjusted contention window. In some aspects, the adjusted contention window is based on the ACK/NACK feedback associated with the reference duration. For example, the adjusted contention window is increased when the ACK/NACK feedback associated with the reference duration is a NACK. In another example, the adjusted contention window is decreased when the ACK/NACK feedback associated with the reference duration is an ACK.

The apparatus includes a transmission component 1306 that transmits uplink communication to the base station 1350. The transmission component 1306 may be configured to transmit various messages to one or more external devices, e.g., including the base station 1350, in accordance with the methods disclosed herein. The messages/signals to be transmitted may be generated by one or more other components as discussed above, or the messages/signals to be transmitted may be generated by the transmission component 1306 under the direction/control of the one or more other components discussed supra. Thus, in various configurations, via the transmission component 1306, the apparatus 1302 and/or one or more components therein transmit signals and/or other information (e.g., such as uplink data, control messages and/or other signals) to external devices such as the base station 1350. In some aspects, the transmission component 1306 is configured to transmit an acknowledgment (ACK)/non-acknowledgment (NACK) feedback to the base station in response to the downlink transmission, e.g., as described in connection with block 910 of FIG. 9. In some aspects, the transmission component 1306 is configured to transmit a subsequent downlink transmission. In some aspects, the subsequent uplink transmission includes an adjusted maximum burst length. In some aspects, the subsequent uplink transmission includes a same maximum burst length as a maximum burst length for the uplink transmission. In some aspects, the transmission component 1306 is configured to transmitting an uplink transmission to the base station in response to the uplink grant, e.g., as described in connection with block 1004 of FIG. 10. In some aspects, the uplink transmission is a PUSCH, in which the reference duration is a last slot of the PUSCH.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
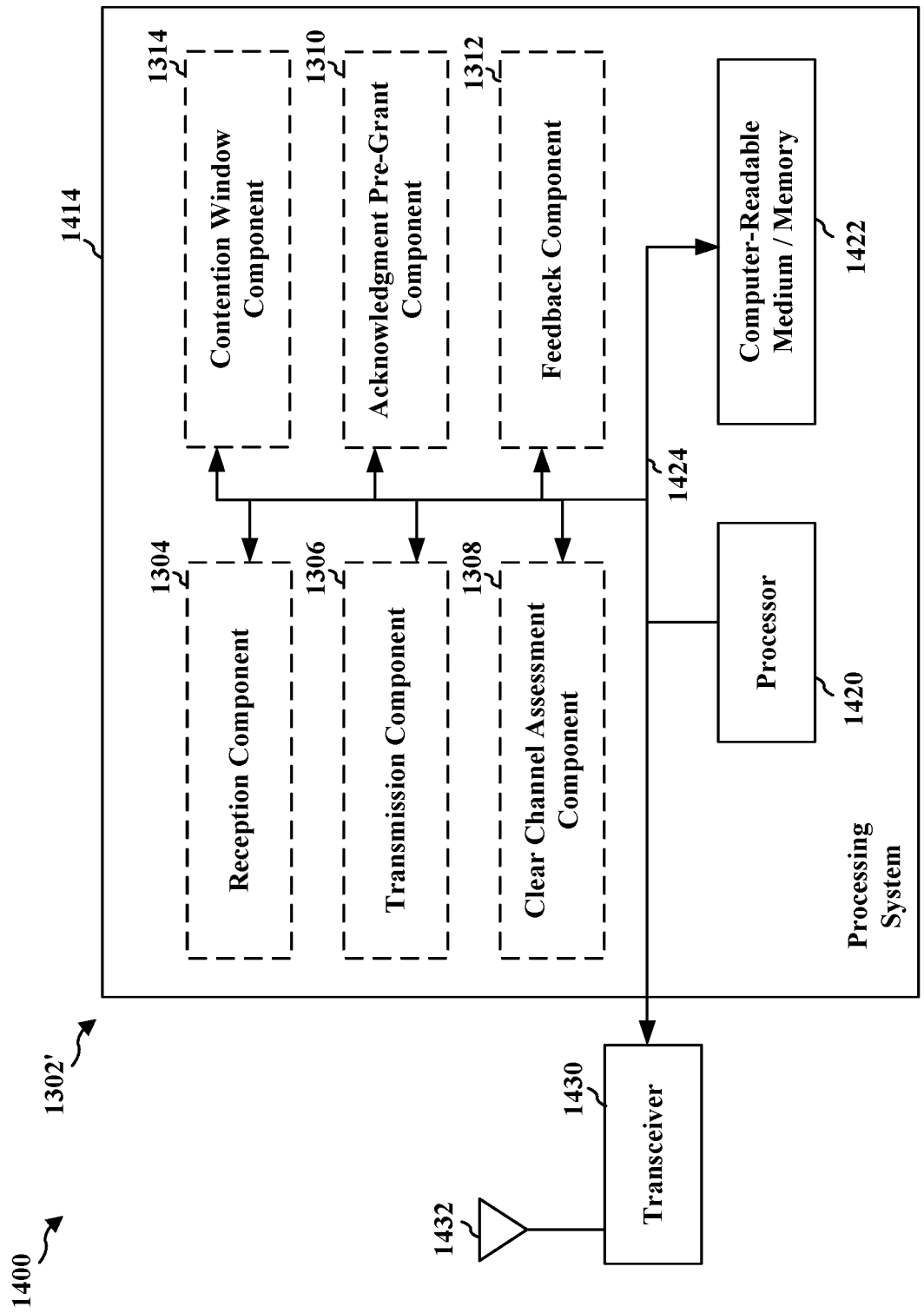
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1420, the components 1304, 1306, 1308, 1310, 1312, 1314 and the computer-readable medium/memory 1422. The bus 1424 may also link various other circuits such as timing sources, peripherals, voltage regulators, and power management circuits, which are well known in the art, and therefore, will not be described any further.

The processing system 1414 may be coupled to a transceiver 1430. The transceiver 1430 is coupled to one or more antennas 1432. The transceiver 1430 provides a means for communicating with various other apparatus over a transmission medium. The transceiver 1430 receives a signal from the one or more antennas 1432, extracts information from the received signal, and provides the extracted information to the processing system 1414, specifically the reception component 1304. In addition, the transceiver 1430 receives information from the processing system 1414, specifically the transmission component 1306, and based on the received information, generates a signal to be applied to the one or more antennas 1432. The processing system 1414 includes a processor 1420 coupled to a computer-readable medium/memory 1422. The processor 1420 is responsible for general processing, including the execution of software stored on the computer-readable medium/memory 1422. The software, when executed by the processor 1420, causes the processing system 1414 to perform the various functions described supra for any particular apparatus. The computer-readable medium/memory 1422 may also be used for storing data that is manipulated by the processor 1420 when executing software. The processing system 1414 further includes at least one of the components 1304, 1306, 1308, 1310, 1312, 1314. The components may be software components running in the processor 1420, resident/stored in the computer readable medium/memory 1422, one or more hardware components coupled to the processor 1420, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a pre-grant for a downlink transmission from a base station. In some aspects, the pre-grant indicates a clear channel assessment (CCA) length based on a contention window size associated at least with a burst length of the downlink transmission. The apparatus 1302/1302' also includes means for performing, after receiving the pre-grant, a CCA based on the CCA length. The apparatus 1302/1302' also includes means for transmitting an acknowledgment of the pre-grant (APG) to the base station when the CCA is successful. The apparatus 1302/1302' also includes means for receiving the downlink transmission from the base station in response to the APG.

In another configuration, the apparatus 1302/1302' for wireless communication includes means for receiving an uplink grant from a base station after a CCA of the base station. The apparatus 1302/1302' also includes means for transmitting an uplink transmission to the base station in response to the uplink grant. In some aspects, the CCA is based on a contention window associated at least with a burst length for the uplink transmission.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
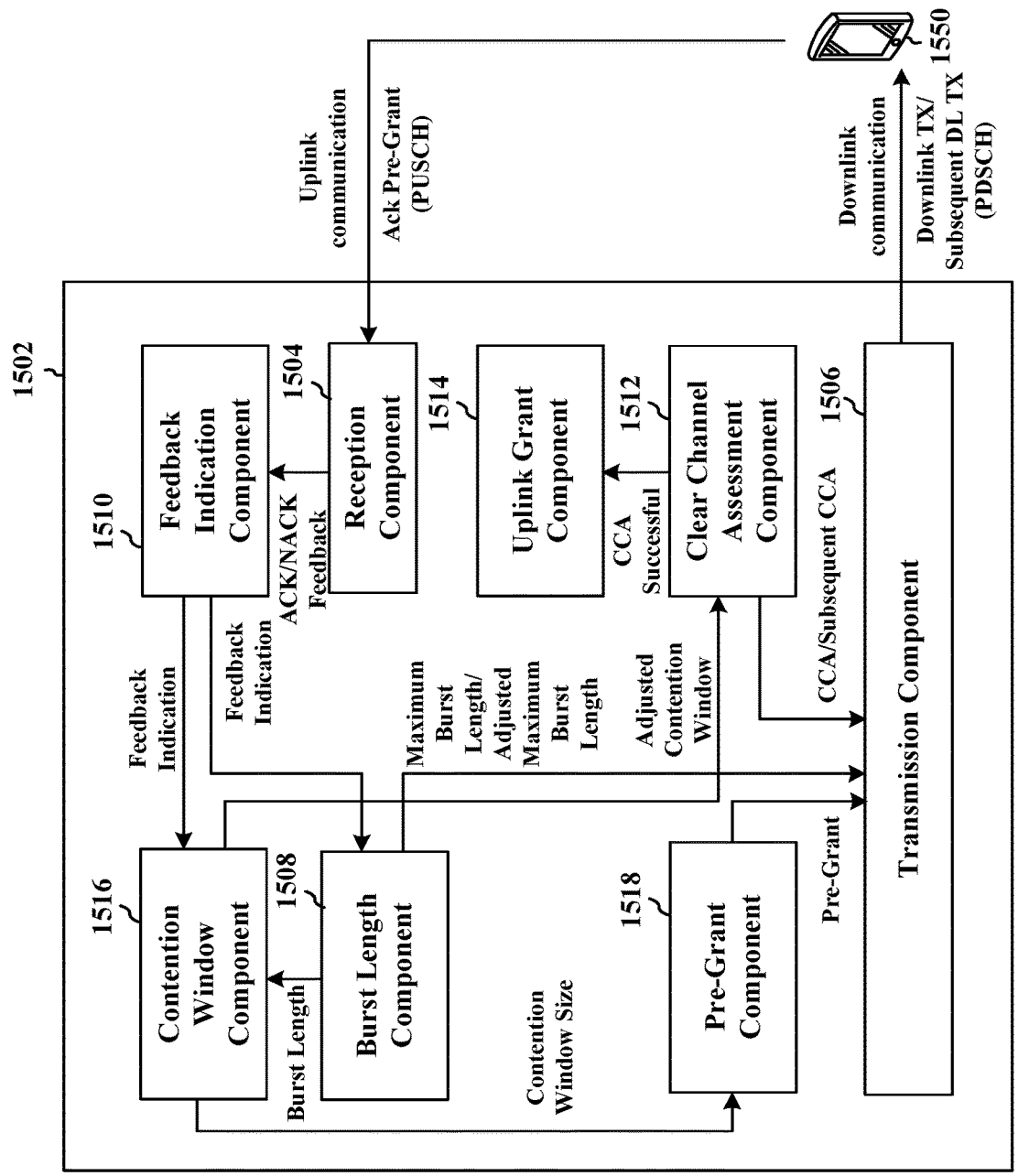
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station (e.g., BS 102, 180, 310, 504, 506, 604, 702, 804, 854) in wireless communication with UE 1550.

The apparatus 1502 includes a burst length component 1508 configured to determine a maximum burst length. In some aspects, the subsequent uplink transmission includes an adjusted maximum burst length. In some aspects, the subsequent uplink transmission includes a same maximum burst length as a maximum burst length for the uplink transmission. In other aspects, the burst length component 1508 is configured to determine an adjusted maximum burst length. In some aspects, a subsequent downlink transmission includes an adjusted maximum burst length. In some aspects, the adjusted maximum burst length is based on the feedback indication associated with the reference duration. For example, the adjusted maximum burst length is based on the ACK/NACK feedback associated with the reference duration. In some aspects, the adjusted maximum burst length is decreased when the feedback indication associated with the reference duration is a NACK. For example, the adjusted maximum burst length is decreased when the ACK/NACK feedback associated with the reference duration is a NACK. In other aspects, the adjusted maximum burst length is increased when the feedback indication associated with the reference duration is an ACK. For example, the adjusted maximum burst length is increased when the ACK/NACK feedback associated with the reference duration is an ACK.

The apparatus 1502 includes a feedback indication component 1510 configured to receive an acknowledgment (ACK)/non-acknowledgment (NACK) feedback from the UE in response to a downlink transmission, e.g., as described in connection with block 1108 of FIG. 11. In some aspects, the feedback indication component 1510 is configured to transmit a feedback indication to the UE in response to the uplink transmission, e.g., as described in connection with block 1208 of FIG. 12. In some aspects, the feedback indication is based on a new data indicator (NDI) in the another uplink grant for a hybrid automatic repeat request (HARQ) process. In some aspects, the adjusted maximum burst length and the adjusted contention window are based on the feedback indication associated with the reference duration. For example, the adjusted maximum burst length and the adjusted contention window are based on the ACK/NACK feedback associated with the reference duration.

The apparatus 1502 includes a clear channel assessment component 1512 configured to perform a CCA based on a contention window associated at least with a burst length for an uplink transmission, e.g., as described in connection with block 1202 of FIG. 12. In some aspects, the clear channel assessment component 1510 is also configured to perform a subsequent CCA prior to sending another uplink grant to the UE for a subsequent uplink transmission, e.g., as described in connection with block 1210 of FIG. 12. In some aspects, at least one of the subsequent CCA or the subsequent uplink transmission is based on the feedback indication associated with a reference duration at an end of the burst length for the uplink transmission. In some aspects, the subsequent CCA is performed based on an adjusted contention window associated with the same maximum burst length. In other aspects, the subsequent CCA is performed based on a same contention window as the contention window for the uplink transmission. In some aspects, the subsequent CCA is based on a same contention window size as the contention window size for the downlink transmission. In some aspects, the subsequent CCA is performed based on an adjusted contention window associated with the adjusted maximum burst length.

The apparatus 1502 includes an uplink grant component 1514 configured to transmit an uplink grant to a UE when the CCA is successful, e.g., as described in connection with block 1204 of FIG. 12.

The apparatus 1502 includes a contention window component 1516 configured to determine an adjusted contention window. In some aspects, the adjusted contention window is based on the feedback indication associated with the reference duration. For example, the adjusted contention window is based on the ACK/NACK feedback associated with the reference duration. In some aspects, the adjusted contention window is increased when the feedback indication associated with the reference duration is a NACK. For example, the adjusted contention window is increased when the ACK/NACK feedback associated with the reference duration is a NACK. In other aspects, the adjusted contention window is decreased when the feedback indication associated with the reference duration is an ACK. For example, the adjusted contention window is decreased when the ACK/NACK feedback associated with the reference duration is an ACK.

The apparatus 1502 includes a pre-grant component 1518 configured to transmit a pre-grant for a downlink transmission to a UE, e.g., as described in connection with block 1102 of FIG. 11. In some aspects, the pre-grant indicates a CCA length based on a contention window size associated at least with a burst length of the downlink transmission. In some aspects, the CCA length includes a backoff within the contention window size for the CCA of the UE.

The apparatus 1502 includes a transmission component 1506 that transmits uplink communication to the UE 1550. The transmission component 1506 may be configured to transmit various messages to one or more external devices, e.g., including the UE 1550, in accordance with the methods disclosed herein. The messages/signals to be transmitted may be generated by one or more other components as discussed above, or the messages/signals to be transmitted may be generated by the transmission component 1506 under the direction/control of the one or more other components discussed supra. Thus, in various configurations, via the transmission component 1506, the apparatus 1502 and/or one or more components therein transmit signals and/or other information (e.g., such as downlink data, control messages and/or other signals) to external devices such as the UE 1550. In some aspects, the transmission component 1506 is configured to send the downlink transmission to the UE in response to the APG, e.g., as described in connection with block 1106 of FIG. 11. In some aspects, the transmission component 1506 is configured to transmit a subsequent downlink transmission to the UE after a subsequent CCA of the UE, e.g., as described in connection with block 1110 of FIG. 11. In some aspects, the subsequent downlink transmission includes a same maximum burst length as a maximum burst length for the downlink transmission. In some aspects, at least one of the subsequent CCA or the subsequent downlink transmission is based on the ACK/NACK feedback associated with a reference duration at an end of the burst length for the downlink transmission. In some aspects, the downlink transmission is a PDSCH, and the reference duration is a last slot of the PDSCH.

The apparatus 1502 includes a reception component 1504 that receives uplink communication from the UE 1550. The reception component 1504 may be configured to receive signals and/or other information from other devices including, e.g., UE 1550. The signals/information received by the reception component 1504 may be provided to one or more components of the apparatus 1502 for further processing and use in performing various operations in accordance with the methods discussed supra including the processes of the aforementioned flowcharts 1100 and 1200. Thus, via the reception component 1504, the apparatus 1502 and/or one or more components therein receive signals and/or other information (e.g., such as uplink data for the apparatus 1502 and/or other control signaling) from the UE 1550 as discussed supra and also discussed more specifically infra. In some aspects, the reception component 1504 is configured to receive the uplink transmission from the UE in response to the uplink grant, e.g., as described in connection with block 1206 of FIG. 12. In some aspects, the uplink transmission is a PUSCH. In some aspects, the reference duration is a last slot of the PUSCH. In some aspects, the reception component 1504 is configured to receive an acknowledgment of the pre-grant (APG) from the UE when a CCA of the UE based on the CCA length is successful, e.g., as described in connection with block 1104 of FIG. 11.

The apparatus 1502 may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
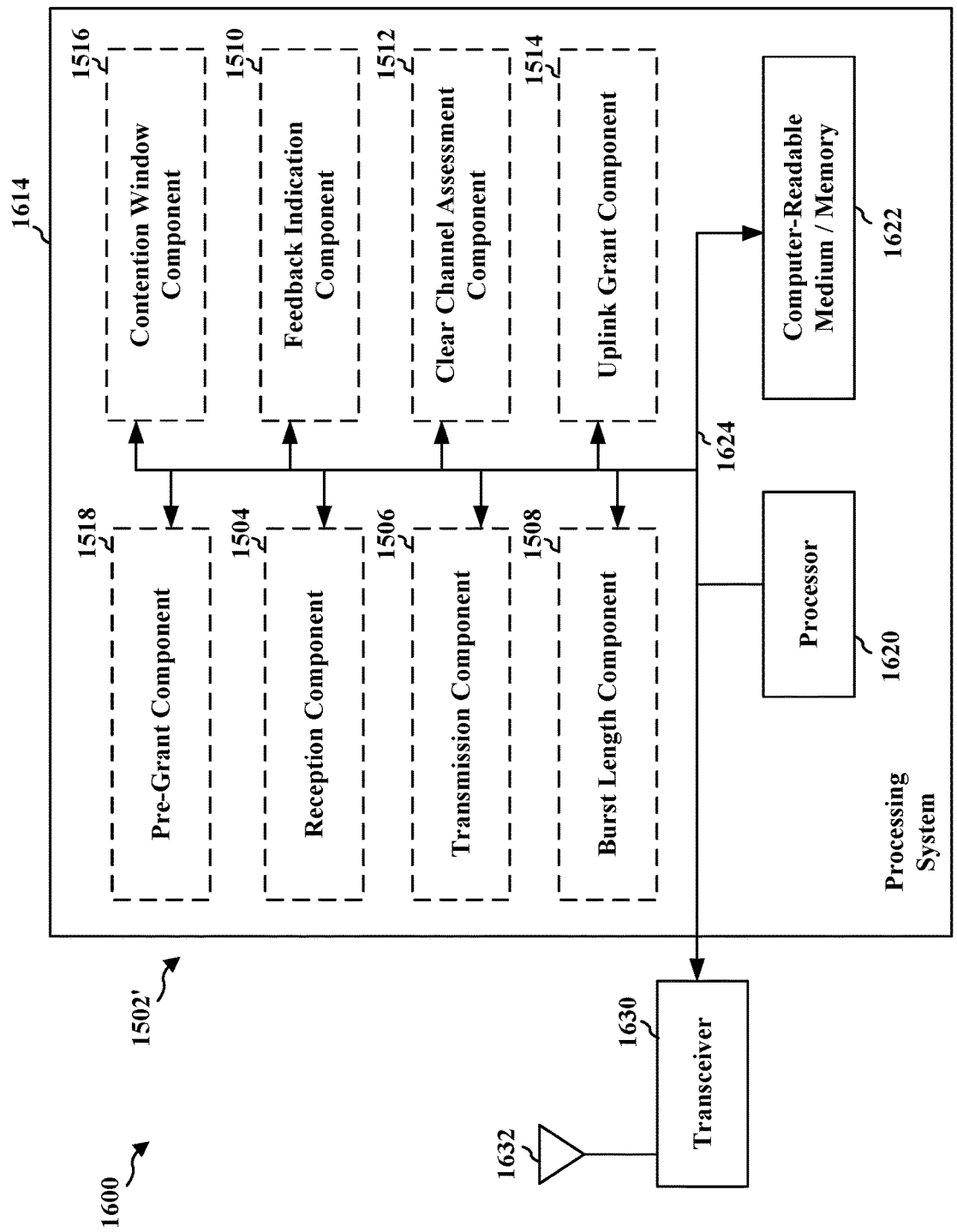
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1620, the components 1504, 1506, 1508, 1510, 1512, 1514, 1516, 1518 and the computer-readable medium/memory 1622. The bus 1624 may also link various other circuits such as timing sources, peripherals, voltage regulators, and power management circuits, which are well known in the art, and therefore, will not be described any further.

The processing system 1614 may be coupled to a transceiver 1630. The transceiver 1630 is coupled to one or more antennas 1632. The transceiver 1630 provides a means for communicating with various other apparatus over a transmission medium. The transceiver 1630 receives a signal from the one or more antennas 1632, extracts information from the received signal, and provides the extracted information to the processing system 1614, specifically the reception component 1504. In addition, the transceiver 1630 receives information from the processing system 1614, specifically the transmission component 1506, and based on the received information, generates a signal to be applied to the one or more antennas 1632. The processing system 1614 includes a processor 1620 coupled to a computer-readable medium/memory 1622. The processor 1620 is responsible for general processing, including the execution of software stored on the computer-readable medium/memory 1622. The software, when executed by the processor 1620, causes the processing system 1614 to perform the various functions described supra for any particular apparatus. The computer-readable medium/memory 1622 may also be used for storing data that is manipulated by the processor 1620 when executing software. The processing system 1614 further includes at least one of the components 1504, 1506, 1508, 1510, 1512, 1514, 1516, 1518. The components may be software components running in the processor 1620, resident/stored in the computer readable medium/memory 1622, one or more hardware components coupled to the processor 1620, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for transmitting a first signal in uplink (UL) resources to a first base station, means for receiving a second signal in downlink (DL) resources concurrently with the transmission of the first signal to the first base station, the received second signal including interference associated with the transmitted first signal, means for determining a level of the interference received in the second signal that is associated with the transmitted first signal, and means for transmitting information associated with the determined level of interference to the first base station.

In another configuration, the apparatus 1502/1502' for wireless communication includes means for performing a clear channel assessment (CCA) based on a contention window associated at least with a burst length for an uplink transmission. The apparatus 1502/1502' also includes means for transmitting an uplink grant to a user equipment (UE) when the CCA is successful. The apparatus 1502/1502' also includes means for receiving the uplink transmission from the UE in response to the uplink grant.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with aspects of other implementations or teachings described herein, without limitation.

Aspect 1 is a method of wireless communication at a user equipment (UE) that includes receiving a pre-grant for a downlink transmission from a base station, the pre-grant indicating a clear channel assessment (CCA) length based on a contention window size associated at least with a burst length of the downlink transmission; performing, after receiving the pre-grant, a CCA based on the CCA length; transmitting an acknowledgment of the pre-grant (APG) to the base station when the CCA is successful; and receiving the downlink transmission from the base station in response to the APG.

In Aspect 2, the method of Aspect 1 further includes that the CCA length comprises a backoff within the contention window size for the UE to apply when performing the CCA.

In Aspect 3, the method of Aspect 1 or Aspect 2 further includes transmitting an acknowledgment (ACK)/non-acknowledgment (NACK) feedback to the base station in response to the downlink transmission; and performing a subsequent CCA prior to receiving a subsequent downlink transmission from the base station; wherein at least one of the subsequent CCA or the subsequent downlink transmission is based on the ACK/NACK feedback associated with a reference duration at an end of the burst length for the downlink transmission.

In Aspect 4, the method of any of Aspects 1-3 further includes that the downlink transmission is a physical downlink shared channel (PDSCH), and the reference duration is a last slot of the PDSCH.

In Aspect 5, the method of any of Aspects 1-4 further includes that the subsequent downlink transmission includes a same maximum burst length as a maximum burst length for the downlink transmission; and the subsequent CCA is performed based on an adjusted contention window associated with the same maximum burst length, the adjusted contention window being based on the ACK/NACK feedback associated with the reference duration.

In Aspect 6, the method of any of Aspects 1-5 further includes that the adjusted contention window is increased when the ACK/NACK feedback associated with the reference duration is a NACK, and wherein the adjusted contention window is decreased when the ACK/NACK feedback associated with the reference duration is an ACK.

In Aspect 7, the method of any of Aspects 1-6, further includes that the subsequent downlink transmission includes an adjusted maximum burst length, the adjusted maximum burst length being based on the ACK/NACK feedback associated with the reference duration; and wherein the subsequent CCA is performed based on a same contention window size as the contention window size for the downlink transmission.

In Aspect 8, the method of any of Aspects 1-7 further includes that the adjusted maximum burst length is decreased when the ACK/NACK feedback associated with the reference duration is a NACK, and wherein the adjusted maximum burst length is increased when the ACK/NACK feedback associated with the reference duration is an ACK.

In Aspect 9, the method of any of Aspects 1-8 further includes that the subsequent downlink transmission includes an adjusted maximum burst length; the subsequent CCA is performed based on an adjusted contention window associated with the adjusted maximum burst length; and the adjusted maximum burst length and the adjusted contention window are based on the ACK/NACK feedback associated with the reference duration.

Aspect 10 is a device including one or more processors and one or more memories in electronic communication with the one or more processors storing instructions executable by the one or more processors to cause the system or apparatus to implement a method as in any of Aspects 1 to 9.

Aspect 11 is a system or apparatus including means for implementing a method or realizing an apparatus as in any of Aspects 1 to 9.

Aspect 12 is a non-transitory computer readable medium storing instructions executable by one or more processors to cause the one or more processors to implement a method as in any of Aspects 1 to 9.

Aspect 13 is a method of wireless communication at a user equipment (UE) that includes receiving an uplink grant from a base station after a clear channel assessment (CCA) of the base station; and transmitting an uplink transmission to the base station in response to the uplink grant; wherein the CCA is based on a contention window associated at least with a burst length for the uplink transmission.

In Aspect 14, the method of Aspect 13 further includes receiving a feedback indication from the base station in response to the uplink transmission; and receiving, after a subsequent CCA of the base station, another uplink grant from the base station for a subsequent uplink transmission; wherein at least one of the subsequent CCA or the subsequent uplink transmission is based on the feedback indication associated with a reference duration at an end of the burst length for the uplink transmission.

In Aspect 15, the method of Aspect 13 or Aspect 14 further includes that the uplink transmission is a physical uplink shared channel (PUSCH), wherein the reference duration is a last slot of the PUSCH, and wherein the feedback indication is based on a new data indicator (NDI) in the another uplink grant for a hybrid automatic repeat request (HARQ) process.

In Aspect 16, the method of any of Aspects 1-15 further includes that the subsequent uplink transmission includes a same maximum burst length as a maximum burst length for the uplink transmission; and the subsequent CCA is based on an adjusted contention window associated with the same maximum burst length, the adjusted contention window being based on the feedback indication associated with the reference duration.

In Aspect 17, the method of any of Aspects 1-16 further includes that the adjusted contention window is increased when the feedback indication associated with the reference duration is a NACK, and wherein the adjusted contention window is decreased when the feedback indication associated with the reference duration is an ACK.

In Aspect 18, the method of any of Aspects 1-17 further includes that the subsequent uplink transmission includes an adjusted maximum burst length, the adjusted maximum burst length being based on the feedback indication associated with the reference duration; and the subsequent CCA is based on a same contention window as the contention window for the uplink transmission.

In Aspect 19, the method of any of Aspects 1-18 further includes that the adjusted maximum burst length is decreased when the feedback indication associated with the reference duration is a NACK, and wherein the adjusted maximum burst length is increased when the feedback indication associated with the reference duration is an ACK.

In Aspect 20, the method of any of Aspects 1-9 further includes that the subsequent uplink transmission includes an adjusted maximum burst length; the subsequent CCA is based on an adjusted contention window associated with the adjusted maximum burst length; and the adjusted maximum burst length and the adjusted contention window are based on the feedback indication associated with the reference duration.

Aspect 21 is a device including one or more processors and one or more memories in electronic communication with the one or more processors storing instructions executable by the one or more processors to cause the system or apparatus to implement a method as in any of Aspects 1 to 20.

Aspect 22 is a system or apparatus including means for implementing a method or realizing an apparatus as in any of Aspects 1 to 20.

Aspect 23 is a non-transitory computer readable medium storing instructions executable by one or more processors to cause the one or more processors to implement a method as in any of Aspects 1 to 20.

Aspect 24 is a method of wireless communication at a base station that includes transmitting a pre-grant for a downlink transmission to a user equipment (UE), the pre-grant indicating a clear channel assessment (CCA) length based on a contention window size associated at least with a burst length of the downlink transmission; receiving an acknowledgment of the pre-grant (APG) from the UE when a CCA of the UE based on the CCA length is successful; and sending the downlink transmission to the UE in response to the APG.

In Aspect 25, the method of Aspect 24 further includes that the CCA length comprises a backoff within the contention window size for the CCA of the UE.

In Aspect 26, the method of Aspect 24 or Aspect 25 further includes receiving an acknowledgment (ACK)/non-acknowledgment (NACK) feedback from the UE in response to the downlink transmission; and transmitting a subsequent downlink transmission to the UE after a subsequent CCA of the UE; wherein at least one of the subsequent CCA or the subsequent downlink transmission is based on the ACK/NACK feedback associated with a reference duration at an end of the burst length for the downlink transmission.

In Aspect 27, the method of any of Aspects 24-26 further includes that the downlink transmission is a physical downlink shared channel (PDSCH), and the reference duration is a last slot of the PDSCH.

In Aspect 28, the method of any of Aspects 24-27 further includes that the subsequent downlink transmission includes a same maximum burst length as a maximum burst length for the downlink transmission; the subsequent CCA is based on an adjusted contention window associated with the same maximum burst length, the adjusted contention window being based on the ACK/NACK feedback associated with the reference duration, the adjusted contention window is increased when the ACK/NACK feedback associated with the reference duration is a NACK, and the adjusted contention window is decreased when the ACK/NACK feedback associated with the reference duration is an ACK.

In Aspect 29, the method of any of Aspects 24-28 further includes that the subsequent downlink transmission includes an adjusted maximum burst length, the adjusted maximum burst length being based on the ACK/NACK feedback associated with the reference duration; the subsequent CCA is based on a same contention window size as the contention window size for the downlink transmission, the adjusted maximum burst length is decreased when the ACK/NACK feedback associated with the reference duration is a NACK, and the adjusted maximum burst length is increased when the ACK/NACK feedback associated with the reference duration is an ACK.

In Aspect 30, the method of any of Aspects 24-29 further includes that the subsequent downlink transmission includes an adjusted maximum burst length; the subsequent CCA is based on an adjusted contention window associated with the adjusted maximum burst length; and the adjusted maximum burst length and the adjusted contention window are based on the ACK/NACK feedback associated with the reference duration.

Aspect 31 is a device including one or more processors and one or more memories in electronic communication with the one or more processors storing instructions executable by the one or more processors to cause the system or apparatus to implement a method as in any of Aspects 1 to 30.

Aspect 32 is a system or apparatus including means for implementing a method or realizing an apparatus as in any of Aspects 1 to 30.

Aspect 33 is a non-transitory computer readable medium storing instructions executable by one or more processors to cause the one or more processors to implement a method as in any of Aspects 1 to 30.

Aspect 34 is a method of wireless communication at a base station that includes performing a clear channel assessment (CCA) based on a contention window associated at least with a burst length for an uplink transmission; transmitting an uplink grant to a user equipment (UE) when the CCA is successful; and receiving the uplink transmission from the UE in response to the uplink grant.

In Aspect 35, the method of Aspect 34 further includes transmitting a feedback indication to the UE in response to the uplink transmission; and performing a subsequent CCA prior to sending another uplink grant to the UE for a subsequent uplink transmission; wherein at least one of the subsequent CCA or the subsequent uplink transmission is based on the feedback indication associated with a reference duration at an end of the burst length for the uplink transmission.

In Aspect 36, the method of Aspect 34 or Aspect 35 further includes that the uplink transmission is a physical uplink shared channel (PUSCH), wherein the reference duration is a last slot of the PUSCH, and wherein the feedback indication is based on a new data indicator (NDI) in the another uplink grant for a hybrid automatic repeat request (HARQ) process.

In Aspect 37, the method of any of Aspects 34-36 further includes that the subsequent uplink transmission includes a same maximum burst length as a maximum burst length for the uplink transmission; the subsequent CCA is performed based on an adjusted contention window associated with the same maximum burst length, the adjusted contention window being based on the feedback indication associated with the reference duration, the adjusted contention window is increased when the feedback indication associated with the reference duration is a NACK, and the adjusted contention window is decreased when the feedback indication associated with the reference duration is an ACK.

In Aspect 38, the method of any of Aspects 34-36 further includes that the subsequent uplink transmission includes an adjusted maximum burst length, the adjusted maximum burst length being based on the feedback indication associated with the reference duration; the subsequent CCA is performed based on a same contention window as the contention window for the uplink transmission, the adjusted maximum burst length is decreased when the feedback indication associated with the reference duration is a NACK, and the adjusted maximum burst length is increased when the feedback indication associated with the reference duration is an ACK.

In Aspect 39, the method of any of Aspects 34-38 further includes that the subsequent uplink transmission includes an adjusted maximum burst length; the subsequent CCA is performed based on an adjusted contention window associated with the adjusted maximum burst length; and the adjusted maximum burst length and the adjusted contention window are based on the feedback indication associated with the reference duration.

Aspect 40 is a device including one or more processors and one or more memories in electronic communication with the one or more processors storing instructions executable by the one or more processors to cause the system or apparatus to implement a method as in any of Aspects 1 to 39.

Aspect 41 is a system or apparatus including means for implementing a method or realizing an apparatus as in any of Aspects 1 to 39.

Aspect 42 is a non-transitory computer readable medium storing instructions executable by one or more processors to cause the one or more processors to implement a method as in any of Aspects 1 to 39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) comprising:
   receiving a pre-grant for a downlink transmission from a base station, the pre-grant indicating a clear channel assessment (CCA) length based on a contention window size associated at least with a burst length of the downlink transmission;
   performing, after receiving the pre-grant, a CCA based on the CCA length;
   transmitting an acknowledgment of the pre-grant (APG) to the base station when the CCA is successful; and
   receiving the downlink transmission from the base station in response to the APG.

2. The method of claim 1, wherein the CCA length comprises a backoff within the contention window size for the UE to apply when performing the CCA.

3. The method of claim 1, further comprising:
   transmitting an acknowledgment (ACK)/non-acknowledgment (NACK) feedback to the base station in response to the downlink transmission; and
   performing a subsequent CCA prior to receiving a subsequent downlink transmission from the base station,
   wherein at least one of the subsequent CCA or the subsequent downlink transmission is based on the ACK/NACK feedback associated with a reference duration at an end of the burst length for the downlink transmission.

4. The method of claim 3, wherein the downlink transmission is a physical downlink shared channel (PDSCH), and the reference duration is a last slot of the PDSCH.

5. The method of claim 3, wherein:
   the subsequent downlink transmission includes a same maximum burst length as a maximum burst length for the downlink transmission, and
   the subsequent CCA is performed based on an adjusted contention window associated with the same maximum burst length, the adjusted contention window being based on the ACK/NACK feedback associated with the reference duration.

6. The method of claim 5, wherein the adjusted contention window is increased when the ACK/NACK feedback associated with the reference duration is a NACK, and wherein the adjusted contention window is decreased when the ACK/NACK feedback associated with the reference duration is an ACK.

7. The method of claim 3, wherein:
   the subsequent downlink transmission includes an adjusted maximum burst length, the adjusted maximum burst length being based on the ACK/NACK feedback associated with the reference duration, and
   the subsequent CCA is performed based on a same contention window size as the contention window size for the downlink transmission.

8. The method of claim 7, wherein the adjusted maximum burst length is decreased when the ACK/NACK feedback associated with the reference duration is a NACK, and wherein the adjusted maximum burst length is increased when the ACK/NACK feedback associated with the reference duration is an ACK.

9. The method of claim 3, wherein:
   the subsequent downlink transmission includes an adjusted maximum burst length,
   the subsequent CCA is performed based on an adjusted contention window associated with the adjusted maximum burst length, and
   the adjusted maximum burst length and the adjusted contention window are based on the ACK/NACK feedback associated with the reference duration.

10. An apparatus for wireless communication at a user equipment (UE), the apparatus comprising:
    at least one processor; and
    a memory, coupled to the at least one processor, storing computer-executable code that when executed by the at least one processor, causes the apparatus to:
    receive an uplink grant from a base station after a clear channel assessment (CCA) of the base station; and
    transmit an uplink transmission to the base station in response to the uplink grant,
    wherein the CCA is based on a contention window associated at least with a burst length for the uplink transmission.

11. The apparatus of claim 10, wherein the code further causes the apparatus to:
    receive a feedback indication from the base station in response to the uplink transmission; and
    receive, after a subsequent CCA of the base station, another uplink grant from the base station for a subsequent uplink transmission,
    wherein at least one of the subsequent CCA or the subsequent uplink transmission is based on the feedback indication associated with a reference duration at an end of the burst length for the uplink transmission.

12. The apparatus of claim 11, wherein the uplink transmission is a physical uplink shared channel (PUSCH), wherein the reference duration is a last slot of the PUSCH, and wherein the feedback indication is based on a new data indicator (NDI) in the other uplink grant for a hybrid automatic repeat request (HARD) process.

13. The apparatus of claim 11, wherein:
    the subsequent uplink transmission includes a same maximum burst length as a maximum burst length for the uplink transmission, and
    the subsequent CCA is based on an adjusted contention window associated with the same maximum burst length, the adjusted contention window being based on the feedback indication associated with the reference duration.

14. The apparatus of claim 13, wherein the adjusted contention window is increased when the feedback indication associated with the reference duration is a NACK, and wherein the adjusted contention window is decreased when the feedback indication associated with the reference duration is an ACK.

15. The apparatus of claim 11, wherein:
    the subsequent uplink transmission includes an adjusted maximum burst length, the adjusted maximum burst length being based on the feedback indication associated with the reference duration, and the subsequent CCA is based on a same contention window as the contention window for the uplink transmission.

16. The apparatus of claim 15, wherein the adjusted maximum burst length is decreased when the feedback indication associated with the reference duration is a NACK, and wherein the adjusted maximum burst length is increased when the feedback indication associated with the reference duration is an ACK.

17. The apparatus of claim 11, wherein:
the subsequent uplink transmission includes an adjusted maximum burst length,
the subsequent CCA is based on an adjusted contention window associated with the adjusted maximum burst length, and
the adjusted maximum burst length and the adjusted contention window are based on the feedback indication associated with the reference duration.

18. A method of wireless communication at a base station comprising:
transmitting a pre-grant for a downlink transmission to a user equipment (UE), the pre-grant indicating a clear channel assessment (CCA) length based on a contention window size associated at least with a burst length of the downlink transmission;
receiving an acknowledgment of the pre-grant (APG) from the UE when a CCA of the UE based on the CCA length is successful; and
sending the downlink transmission to the UE in response to the APG.

19. The method of claim 18, wherein the CCA length comprises a backoff within the contention window size for the CCA of the UE.

20. The method of claim 18, further comprising:
receiving an acknowledgment (ACK)/non-acknowledgment (NACK) feedback from the UE in response to the downlink transmission; and
transmitting a subsequent downlink transmission to the UE after a subsequent CCA of the UE;
wherein at least one of the subsequent CCA or the subsequent downlink transmission is based on the ACK/NACK feedback associated with a reference duration at an end of the burst length for the downlink transmission.

21. The method of claim 20, wherein the downlink transmission is a physical downlink shared channel (PDSCH), and the reference duration is a last slot of the PDSCH.

22. The method of claim 20, wherein:
the subsequent downlink transmission includes a same maximum burst length as a maximum burst length for the downlink transmission,
the subsequent CCA is based on an adjusted contention window associated with the same maximum burst length, the adjusted contention window being based on the ACK/NACK feedback associated with the reference duration,
the adjusted contention window is increased when the ACK/NACK feedback associated with the reference duration is a NACK, and
the adjusted contention window is decreased when the ACK/NACK feedback associated with the reference duration is an ACK.

23. The method of claim 20, wherein:
the subsequent downlink transmission includes an adjusted maximum burst length, the adjusted maximum burst length being based on the ACK/NACK feedback associated with the reference duration,
the subsequent CCA is based on a same contention window size as the contention window size for the downlink transmission,
the adjusted maximum burst length is decreased when the ACK/NACK feedback associated with the reference duration is a NACK, and
the adjusted maximum burst length is increased when the ACK/NACK feedback associated with the reference duration is an ACK.

24. The method of claim 20, wherein:
the subsequent downlink transmission includes an adjusted maximum burst length,
the subsequent CCA is based on an adjusted contention window associated with the adjusted maximum burst length, and
the adjusted maximum burst length and the adjusted contention window are based on the ACK/NACK feedback associated with the reference duration.

25. An apparatus for wireless communication at a base station, the apparatus comprising:
at least one processor; and
a memory, coupled to the at least one processor, storing computer-executable code that when executed by the at least one processor, causes the apparatus to:
perform a clear channel assessment (CCA) based on a contention window associated at least with a burst length for an uplink transmission;
transmit an uplink grant to a user equipment (UE) when the CCA is successful; and
receive the uplink transmission from the UE in response to the uplink grant.

26. The apparatus of claim 25, wherein the code further causes the apparatus to:
transmit a feedback indication to the UE in response to the uplink transmission; and
perform a subsequent CCA prior to sending another uplink grant to the UE for a subsequent uplink transmission,
wherein at least one of the subsequent CCA or the subsequent uplink transmission is based on the feedback indication associated with a reference duration at an end of the burst length for the uplink transmission.

27. The apparatus of claim 26, wherein the uplink transmission is a physical uplink shared channel (PUSCH), wherein the reference duration is a last slot of the PUSCH, and wherein the feedback indication is based on a new data indicator (NDI) in the other uplink grant for a hybrid automatic repeat request (HARD) process.

28. The apparatus of claim 26, wherein:
the subsequent uplink transmission includes a same maximum burst length as a maximum burst length for the uplink transmission,
the subsequent CCA is performed based on an adjusted contention window associated with the same maximum burst length, the adjusted contention window being based on the feedback indication associated with the reference duration,
the adjusted contention window is increased when the feedback indication associated with the reference duration is a NACK, and the adjusted contention window is decreased when the feedback indication associated with the reference duration is an ACK.

29. The apparatus of claim 26, wherein:

the subsequent uplink transmission includes an adjusted maximum burst length, the adjusted maximum burst length being based on the feedback indication associated with the reference duration, the subsequent CCA is performed based on a same contention window as the contention window for the uplink transmission, the adjusted maximum burst length is decreased when the feedback indication associated with the reference duration is a NACK, and the adjusted maximum burst length is increased when the feedback indication associated with the reference duration is an ACK.

30. The apparatus of claim 26, wherein:

the subsequent uplink transmission includes an adjusted maximum burst length, the subsequent CCA is performed based on an adjusted contention window associated with the adjusted maximum burst length, and the adjusted maximum burst length and the adjusted contention window are based on the feedback indication associated with the reference duration.

* * * * *